(12) United States Patent
Tandon et al.

(10) Patent No.: US 6,567,170 B2
(45) Date of Patent: May 20, 2003

(54) SIMULTANEOUS PLURAL COLORS ANALYSIS SPECTROPHOTOMETER

(75) Inventors: Jagdish C. Tandon, Fairport, NY (US); Lingappa K. Mestha, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 47 days.

(21) Appl. No.: 09/888,791

(22) Filed: Jun. 25, 2001

(65) Prior Publication Data

US 2003/0007154 A1 Jan. 9, 2003

(51) Int. Cl.$^7$ ............................................. G01N 21/25
(52) U.S. Cl. ..................... 356/406; 356/402; 356/404; 356/319
(58) Field of Search ............................. 356/402, 404, 356/319, 406

(56) References Cited

U.S. PATENT DOCUMENTS

| | | | |
|---|---|---|---|
| 3,910,701 A | 10/1975 | Henderson et al. ........... 356/89 |
| 4,553,033 A | 11/1985 | Hubble, III et al. ......... 250/353 |
| 4,989,985 A | 2/1991 | Hubble, III et al. ......... 356/445 |
| 5,078,497 A | 1/1992 | Borton et al. ............... 356/446 |
| 5,137,364 A | 8/1992 | McCarthy ................... 356/402 |
| 5,272,518 A | 12/1993 | Vincent ...................... 356/405 |
| 5,377,000 A | 12/1994 | Berends ...................... 356/73 |
| 5,384,918 A | * 1/1995 | Hubble, III et al. ......... 356/402 |
| 5,408,535 A | * 4/1995 | Howard, III et al. ........... 382/1 |
| 5,526,190 A | 6/1996 | Hubble, III et al. ......... 359/719 |
| 5,671,059 A | 9/1997 | Vincent ...................... 356/402 |
| 5,748,221 A | 5/1998 | Castelli et al. .............. 347/232 |
| 5,838,451 A | 11/1998 | McCarthy .................... 356/406 |
| 5,844,680 A | 12/1998 | Sperling ..................... 356/303 |
| 5,963,333 A | 10/1999 | Walowit et al. .............. 356/425 |
| 6,020,583 A | 2/2000 | Walowit et al. .............. 250/226 |
| 6,147,761 A | 11/2000 | Walowit et al. .............. 356/425 |
| 6,157,454 A | 12/2000 | Wagner et al. ............... 356/407 |
| 6,178,007 B1 | * 1/2001 | Harrington ................... 358/1.9 |
| 6,198,536 B1 | * 3/2001 | Baker ......................... 356/402 |
| 6,351,308 B1 | * 2/2002 | Mestha ........................ 356/402 |

\* cited by examiner

*Primary Examiner*—Michael G. Lee
*Assistant Examiner*—Daniel A. Hess

(57) ABSTRACT

A low cost yet higher speed color spectrophotometer, especially suitable for on-line color printer color control systems, wherein multiple test patches of different colors may be simultaneously illuminated and substantially simultaneously discretely color analyzed. Reduced numbers of test print sheets, with multiple sets of multiple small adjacent different color test patches, may be used. Reflected images of the multiple different color test patches may be simultaneously focused on different areas of a photodetector chip to expose differently color responsive sets of multiple photo-sites to provide plural discrete color signals for each different color test patch image.

25 Claims, 9 Drawing Sheets

SIMULTANEOUS PLURAL COLORS ANALYSIS SPECTROPHOTOMETER

Cross-reference and incorporation by reference is made to the following copending and commonly assigned U.S. patent applications: U.S. appln. Ser. No. 09/448,987, filed Nov. 24, 1999, now U.S. Pat. No. 6,351,308, issued Feb. 26, 2002, and U.S. appln. Ser. No. 09/449,263, filed Nov. 24, 1999, both by the same Lingappa K. Mestha; and U.S. appln. Ser. No. 09/535,007, filed Mar. 23, 2000, now U.S. Pat. No. 6,384,918, issued May 7, 2002, by Fred F. Hubble, III and Joel A. Kubby, with an equivalent EPO Publication. No. 103709, dated May 30, 2001; U.S. appln. Ser. No. 09/962, 945, filed May 22, 2001, by Fred F. Hubble, III, Tonya A. Love and Daniel A. Robins, entitled "Angular, Azimuthal and Displacement Insensitive Speotrophotometer For Color Printer Color Control Systems"; U.S. appln. Ser. No. 09/862, 247, filed May 22, 2001, by the same Lingappa K. Mestha and Jagdish C. Tandon, entitled "Color Imager Bar Based Spectrophotometer for Color Printer Color Control System," and U.S. appln. Ser. No. 09/863,042, filed May 22, 2001, by the same Lingappa K. Mestha, Jagdish C. Tandon and Fred F. Hubble, III, entitled "Color Imager Bar Based Spectrophotometer Photodetector Optical Orientation,".

Disclosed in the embodiments herein is an improved, low cost, plural color spectrophotometer for color detection, calibration and/or correction systems, highly suitable to be used for, or incorporated into, the color calibration or control of various color printing systems or other on-line color control or color processing systems.

In particular, the disclosed exemplary spectrophotometer and color measurement system enables more than one test color to be measured at a time, thus increasing the sampling rate and/or reducing the number color test substrates and/or generations of color test patches.

Also disclosed in the embodiment herein is a low cost broad color spectrum spectrophotometer in which different colors may be measured on one or more of the same, low cost, multiple photo-sites, photodetector chips. Disclosed herein is an example of how such multi-pixel (and plural differently color responsive) chips can be used to read plural color test patches simultaneously.

Furthermore, the disclosed embodiment also teaches how the above and other advantageous features may be combined with other advantageous features of a desirably non-contacting spectrophotometer with greatly reduced spatial and angular insensitivity to allowable movements of the color test target area or surface relative to the non-contacting spectrophotometer, as also and further described in the above cross-referenced applications.

The exemplary disclosed spectrophotometer desirably utilizes (incorporates in part) a pre-assembly component or part (hereinafter "chip") of a low cost commercially available document imaging array or bar, such as heretofore used for imaging colored documents in various scanners, digital copiers, and multifunction products. As is well known in the art, such commercial document imaging bars have multiple photo-sites, and are plural spectra responsive, typically by having three rows of respective red, green and blue filtered photo-sites.

As also disclosed in the spectrophotometer embodiment herein, it may employ only a small limited number of different spectra LED or other illumination sources, yet provide multiple data outputs suitable for broad spectral data reconstruction from such a low cost photosensor having plural different spectral responsive photo-sites, by detecting light reflected by a plural color test target area sequentially illuminated by those illumination sources, and/or white light illuminated, to rapidly provide broad spectrum data from a plural colors test surface.

By way of background, examples of full color document imaging bars include those used in various document scanning systems of various well known Xerox Corporation commercial products (including some being alternatively used for black and white imaging) such as the Document Center 255DC™ products, or the Document Center Color Series 50™ products. Some examples of patents relating to semiconductor color imager bars or segments thereof and their operation or circuitry include Xerox Corporation U.S. Pat. No. 5,808,297, issued Sep. 15, 1998; U.S. Pat. No. 5,543,838, issued Aug. 6, 1996; U.S. Pat. No. 5,550,653, issued Aug. 27, 1996; U.S. Pat. No. 5,604,362, issued Feb. 18, 1997; and U.S. Pat. No. 5,519,514, issued May 21, 1996. Typically, such color imaging bars come already provided with at least three different color filters, such as red, green and blue, overlying three rows of closely spaced light sensor elements (photo-sites), to provide electrical output signals corresponding to the colors of the document image being scanned. Such imaging bars are typically formed by edge butting together a number of individual imaging chips, each having such multiple tiny and closely spaced photo-sites. Typically, there are three rows of such photo-sites on each such chip, as in the assembled imaging bar, with said integral filters for red, green and blue, respectively.

Because of the high volumes in which such commercial color imaging bars are made for such products, it has been discovered that their manufacturers can provide, at low cost, a commercial source of said single chip components thereof. The fact that each such chip can provide electrical signals from multiple light sensor elements (photo-sites) in at least three rows of different spectral responses which are closely enough spaced together so as to be simultaneously illuminated by a relatively small area of illumination, is effectively utilized in the spectrophotometer of the embodiment herein. (It will be understood that the term "chip" as used herein does not exclude the use of two or more such chips, either integrally abutted or separately positioned.)

However, it is not believed that heretofore such plural sensors chips for plural color sensing, which are normally put together in series for imaging bars for document scanning, have ever been used in spectrophotometers. These chips themselves are not normally even sold or used individually. The disclosed embodiment illustrates how that may be done, to provide a compact and lower cost spectrophotometer especially suitable for on-line color control systems for sensing the colors of moving printed sheets or other color materials.

Although not limited thereto, the exemplary spectrophotometer of the embodiment herein is shown and described herein in desirable combination as an integral part of an automatic on-line continuous color table correction system of a color printer, in which this low cost spectrophotometer may be affordably provided in the output path of each color printer for automatic measurement of printed color test patches of printer output, without any manual effort or intervention being required. Such color control systems are further described in the above and below cited co-pending applications and patents. For example, in Xerox Corp. U.S. Pat. No. 6,178,007 B1, issued Jan. 23, 2001, based on U.S. application Ser. No. 08/786,010, filed Jan. 21, 1997 by Steven J. Harrington, Attorney Docket No. D/96644, entitled "Method For Continuous Incremental Color Calibration For Color Document Output Terminals." The European patent application equivalent thereof was published by the European Patent Office on Jul. 22, 1998 as EPO Publication No. 0 854 638 A2. Also, Xerox Corp. U.S. Pat. No. 6,222,648, issued Apr. 24, 2001, based on U.S. application Ser. No. 08/787,524, also filed Jan. 21, 1997, by Barry Wolf, et al, entitled "On Line Compensation for Slow Drift of Color Fidelity in Document Output Terminals (DOT)", Attorney Docket No. D/96459. Also noted in this regard are Xerox Corp. U.S. Pat. No. 6,157,469, issued Dec. 5, 2000 and filed May 22, 1998 by Lingappa K. Mestha; Apple Computer, Inc. U.S. Pat. No. 5,881,209, issued 1999; U.S. Pat. No. 5,612,902 issued Mar. 18, 1997 to Michael Stokes, and other patents and applications further noted below.

A low cost, relatively simple, spectrophotometer, as disclosed herein, is thus particularly (but not exclusively) highly desirable for such a "colorimetry" function for such an on-line printer color correction system. Where at least one dedicated spectrophotometer is provided in each printer, its cost and other factors becomes much more significant, as compared to the high cost (and other unsuitability's for on-line use) of typical laboratory spectrophotometers.

An early patent of interest as to using a calorimeter in the printed sheets output of a color printer is Xerox Corp. U.S. Pat. No. 5,748,221, issued May 5, 1998 to Vittorio Castelli, et al, filed Nov. 1, 1995 (D/95398). This patent is also of particular interest here for its Col. 6, lines 18 to 28 description of measuring color:

". . . by imaging a part of an illuminated color patch on three amorphous silicon detector elements after filtering with red, green and blue materials. The technology is akin to that of color input scanners. The detector outputs can be used as densitometric values to assure color consistency. Calibration of the resulting instrument outputs against measurement by laboratory calorimeters taken over a large sample of patches made by the toners of the printer of interest allows mapping to absolute color coordinates (such as L*a*b*)."

Automatic on-line color recalibration systems can be much more effective with an on-line color measurement system where a spectrophotometer may be mounted in the paper path of the moving copy sheets in the printer, preferably in the output path after fusing or drying, without having to otherwise modify the printer, or interfere with or interrupt normal printing, or the movement of the printed sheets in said paper path, and yet provide accurate color measurements of test color patches printed on the moving sheets as they pass the spectrophotometer. That enables a complete closed loop color control of a printer.

Although the specific exemplary low cost color spectrophotometer embodiment herein is shown as a desirable on-line part of an exemplary color printer automatic color control system for color calibration and re-calibration, it will be appreciated that this or other versions of that spectrophotometer are not limited to that disclosed application. Color measurements, and/or the use of color measurements for various other color quality or consistency control functions, are also important for many other different technologies and applications, such as in the production of textiles, wallpaper, plastics, paint, inks, etc. Thus, the disclosed spectrophotometer and/or its related color detection system and/or controls may have applications in various such other fields where various other materials or objects are desirably color tested and/or process controlled. Another application of improved on-line color printing control enabled by a low cost, non-contact, spectrophotometer for spectral analysis and direct color control feedback is to provide much more accurate, yet low cost, local user digital printing of remotely transmitted (over the internet or otherwise) digital camera (or scanned optical camera) color photographs over the internet. Color control of printed photographs, especially flesh tones, is particularly customer sensitive. Plural color test patches can be automatically generated and transmitted with the original photographic image source (adjacent to, or on pages before, or after, the photographic image) for reading their color reproduction accuracy at the output of the remote printer as described herein or otherwise.

By way of general background, studies have demonstrated that humans are particularly sensitive to spatial color variations. Typical full color printing controls, as well as typical color controls in other commercial industries, still typically utilize manual off-line color testing and still often require relatively frequent manual color adjustments by skilled operators. Both the cost and the difficulty of on-line use of prior color measurement apparatus and control systems, and the need for manual recalibration steps, has heretofore inhibited automation of many of such various commercial color testing and color adjustment systems. The disclosed lower cost spectrophotometer addresses both of those concerns.

By way of some examples of the construction or design of various other color spectrophotometers themselves, besides Xerox Corp. U.S. Pat. No. 5,748,221 above, and, especially, the above cross-referenced U.S. application Ser. No. 09/535,007, filed Mar. 23, 2000 by Fred F. Hubble, III and Joel A. Kubby, there is noted HP U.S. Pat. No. 5,671,059, issued 1993; and HP U.S. Pat. No. 5,272,518, issued Dec. 21, 1993; Accuracy Microsensor, Inc. U.S. Pat. No. 5,838,451 and U.S. Pat. No. 5,137,364, both issued to Cornelius J. McCarthy on Nov. 17, 1998 and Aug. 11, 1992, respectively; Color Savvy U.S. Pat. Nos. 6,147,761, 6,020,583, 5,963,333; BYK-Gardner U.S. Pat. No. 5,844,680; and Colorimeter U.S. Pat. No. 6,157,454.

Also of background interest here is that white (instead of narrow spectrum) LED illuminators and plural sensors with different color filters are disclosed in an EP Patent Application No. 0 921 381 A2, published 09.06.1999 for a color sensor for inspecting color print on newspaper or other printed products.

By way of further background, or expressing it in other words, for a desirably low cost implementation of a spectrophotometer with plural light emitting diodes (LEDs) as the respective different color light sources, LEDs of different colors may be selected and switched on individually in sequence to illuminate a test target for a brief length of time sufficient for enough information to be extracted by a photocell of the reflectance spectra of the substrate. Over a number of years, a concentrated effort in the Xerox Corporation Wilson Research Center has designed and built a relatively low cost experimental spectrophotometer using, for example, 10 LEDs, as part of a printer color control system dynamically measuring the color of test patches on the printed output media "on line," that is, while the media is still in the sheet transport or paper path of a print engine, for real-time and fully automatic printer color correction applications. A limited example of that color control system capability was presented in a restricted public technology capability demonstration by Xerox Corporation at the international "Drupa 2000" show in Germany (without public disclosure of the hardware, software or technical details, or any offers to sell). Further details of the specific spectrophotometer embodiment so utilized are disclosed in the prior above first-paragraph cross-referenced patent application by Fred F. Hubble, III and Joel A. Kubby. Each LED thereof was selected to have a narrow band response curve in the spectral space. Ten LEDs provided 10 color calibration measurements on the spectral reflectance curve. The LEDs are switched on one at a time and the reflected light was detected by a single photodetector as a photo-current which may be integrated for few milliseconds to give a voltage output. Thus, 10 voltage outputs per each measured color test patch are available with such a spectrophotometer using 10 LEDs. These voltages may be converted directly to L*a*b* color space, or to 10 reflectance values and then to L*a*b* color space coordinates (if needed). The cost of that LED spectrophotometer hardware includes the head for mounting the 10 spaced LEDs, the lenses, and the basic switching electronics.

Other than the above Xerox Corp. experimental spectrophotometers, some others presently known include a grating-based spectrophotometer made by Ocean Optics Inc., LED based sensors marketed by "ColorSavvy" or Accuracy Microsensor (such as in their above-cited patents); and other spectrophotometers by Gretag MacBeth (Viptronic), ExColor, and X-Rite (DTP41). However, those other spectrophotometers are believed to have significant cost, measurement time, target displacement errors, and/or other difficulties, for use in real-time printer on-line measurements.

For maintaining or lowering the UMC (unit manufacturing cost) of color printers in which a dedicated on-line spectrophotometer and its circuitry would need to be provided in each printer, there is a further need to further bring down the cost of a suitably fast, yet suitably wide spectral range, spectrophotometer. If the spectrophotometer cost can be sufficiently reduced, it may be practicable as well as desirable to provide an on-line output color control system for many or most future color printers, even relatively low cost color printers. That is because, as taught in art cited herein and elsewhere, other components and features of such an on-line printer color control system can be largely implemented in software, which has little incremental UMC, by implementing color correction tables, steps and/or algorithms in software and digital memory. (See, for example, the above-cited Xerox Corp. Steven J. Harrington U.S. Pat. No. 6,178,007 B1, and other art cited therein and/or above, including Xerox Corp. U.S. Pat. No. 6,157,469.)

It is believed that a spectrophotometer of the novel type disclosed herein, utilizing a component chip or portion of a low UMC commercially available color image sensor array or bar, such as imager bars mass produced for commercial use in document scanners, combined with suitable LEDs or other light sources so as to provide a spectrophotometer of suitable speed and spectral outputs, has the potential to give even greater speed at even lower cost than the above-described low cost 10 LED Xerox Corp. LED spectrophotometer.

As used in the patent claims and elsewhere herein, unless otherwise specifically indicated, the term "spectrophotometer" may encompass a spectrophotometer, calorimeter, and densitometer, as broadly defined herein. That is, the word "spectrophotometer" may be given the broadest possible definition and coverage in the claims herein, consistent with the rest of the claim. The definition or use of such above terms may vary or differ among various scientists and engineers. However, the following is an attempt to provide some simplified clarifications relating and distinguishing the respective terms "spectrophotometer," "calorimeter," and "densitometer," as they may be used in the specific context of specification examples of providing components for an on-line color printer color correction system, but not necessarily as claim limitations.

A typical "spectrophotometer" measures the reflectance of an illuminated object of interest over many light wavelengths. Typical prior spectrophotometers in this context use 16 or 32 channels measuring from 400 nm to 700 nm or so, to cover the humanly visible color spectra or wavelength range. A typical spectrophotometer gives color information in terms of measured reflectances or transmittances of light, at the different wavelengths of light, from the test surface. (This is to measure more closely to what the human eye would see as a combined image of a broad white light spectra image reflectance, but the spectrophotometer desirably provides distinct electrical signals corresponding to the different levels of reflected light from the respective different illumination wavelength ranges or channels.)

A "calorimeter" normally has three illumination channels, red, green and blue. That is, generally, a "calorimeter" provides its three (red, green and blue or "RGB") values as read by a light sensor or detector receiving reflected light from a color test surface sequentially illuminated with red, green and blue illuminators, such as three different color LEDs or three lamps with three different color filters. It may thus be considered different from, or a limited special case of, a "spectrophotometer," in that it provides output color information in the trichromatic quantity known as RGB.

Trichromatic quantities may be used for representing color in three coordinate space through some type of transformation. Other RGB conversions to "device independent color space" (i.e., RGB converted to conventional L*a*b*) typically use a color conversion transformation equation or a "lookup table" system in a known manner. (Examples are provided in references cited herein, and elsewhere.)

A "densitometer" typically has only a single channel, and simply measures the amplitude of light reflectivity from the test surface, such as a developed toner test patch on a photoreceptor, at a selected angle over a range of wavelengths, which may be wide or narrow. A single illumination source, such as an IR LED, a visible LED, or an incandescent lamp, may be used. The output of the densitometer detector is programmed to give the optical density of the sample. A densitometer of this type is basically "color blind." For example, a cyan test patch and magenta test patch could have the same optical densities as seen by the densitometer, but, of course, exhibit different colors.

A multiple LED reflectance spectrophotometer, as in the examples of the embodiments herein, may be considered to belong to a special case of spectrophotometers which normally illuminate the target with narrow band or monochromatic light. Others, with wide band illumination sources, can be flashed Xenon lamp spectrophotometers, or incandescent lamp spectrophotometers. A spectrophotometer is normally programmed to give more detailed reflectance values by using more than 3 channel measurements (for example, 10 or more channel measurements), with conversion algorithms. That is in contrast to normal three channel calorimeters, which cannot give accurate, human eye related, reflectance spectra measurements, because they have insufficient measurements for that (only 3 measurements).

The spectrophotometer of the disclosed embodiment is a spectrophotometer especially suitable for being mounted at one side of the printed sheets output path of a color printer to optically evaluate color imprinted output sheets as they move past the spectrophotometer, variably spaced therefrom, without having to contact the sheets or interfere with the normal movement of the sheets. In particular, it may be used to measure a limited number of color test patch samples printed by the printer on actual printed sheet output of the printer during regular or selected printer operation intervals (between normal printing runs or print jobs). These color test sheet printing intervals may be at regular timed intervals, and/or at each machine "cycle-up," or as otherwise directed by the system software. The spectrophotometer may be mounted at one side of the paper path of the machine, or, if it is desired to use duplex color test sheets, two spectrophotometers may be mounted on opposite sides of the paper path.

Relatively frequent color recalibration of a color printer is highly desirable, since the colors actually printed on the output media (as compared to the colors intended to be printed) can significantly change, or drift out of calibration over time, for various known reasons. For example, changes in the selected or loaded print media, such as differences paper or plastic sheet types, materials, weights, calendaring, coating, humidity, etc. Or changes in the printer's ambient conditions, changes in the image developer materials, aging or wear of printer components, varying interactions of different colors being printed, etc. Printing test color patches on test sheets of the same print media under the same printing conditions during the same relative time periods as the color print job being color-controlled is thus very desirable.

It is thus also advantageous to provide dual-mode color test sheets, in which multiple color patches of different colors are printed on otherwise blank areas of each, or selected, banner, cover, or other inter-document or print job separator sheets. Different sets of colors may be printed on different banner or other test sheets. This dual use of such sheets saves both print paper and printer utilization time, and also provides frequent color recalibration opportunities where the printing system is one in which banner sheets are being printed at frequent intervals anyway.

An additional feature which can be provided is to tailor or set the particular colors or combinations of the test patches on a particular banner or other test sheet to those colors which are about to be printed on the specific document for that banner sheet, i.e., the document pages which are to be printed immediately subsequent to that banner sheet (the print job identified by that banner sheet). This can provide a "real time" color correction for the color printer which is tailored to correct printing of the colors of the very next document to be printed.

The preferred implementations of the systems and features disclosed herein may vary depending on the situation. Also, various of the disclosed features or components may be alternatively used for such functions as gray scale balancing, turning on more than one illumination source at once, such as oppositely positioned LEDs, etc.

It will be appreciated that these test patch images and colors may be automatically sent to the printer imager from a stored data file specifically designed for printing the dual mode banner sheet or other color test sheet page, and/or they may be embedded inside the customer job containing the banner page. That is, the latter may be directly electronically associated with the electronic document to be printed, and/or generated or transmitted by the document author or sender. Because the printed test sheet color patches colors and their printing sequence is known (and stored) information, the on-line spectrophotometer measurement data therefrom can be automatically coordinated and compared.

After the spectrophotometer or other color sensor reads the colors of the test patches, the measured color signals may be automatically processed inside the system controller or the printer controller to produce or modify the tone reproduction curve, as explained in the cited references. The color test patches on the next test sheet may then be printed with that new tone reproduction curve. This process may be repeated so as to generate further corrected tone reproduction curves. If the printer's color image printing components and materials are relatively stable, with only relatively slow long term drift, and there is not a print media or other abrupt change, the tone reproduction curve produced using this closed loop control system will be the correct curve for achieving consistent colors for at least one or even a substantial number of customer print jobs printed thereafter, and only relatively infrequent and few color test sheets, such as the normal banner sheets, need be printed.

However, if there are substantial changes in the print media being used by the printer, or other sudden and major disturbances in the printed colors (which can be detected by the spectrophotometer output in response to the test patches on the next dual mode banner sheet or other color test sheet or even, in certain instances, in the imprinted images) then the subsequent customer print job may have incorrect color reproduction. In these situations of customer print media changes in the printer (or new print jobs or job tickets that specify a change in print media for that print job), where that print media change is such that it may substantially affect the accuracy of the printed colors for that subsequent print job, it is not desirable to continue printing and then have to discard the next subsequent print jobs printed with customer unacceptable colors. In that situation it may be preferable in color critical applications to interrupt the normal printing sequence once the sudden color printing disturbance is detected and to instead print plural additional color test sheets in immediate succession, with different color test patch colors, to sense and converge on a new tone reproduction curve that will achieve consistent color printing for that new print media, and only then to resume the normal printing sequence of customer print jobs. Thus, the subsequent customer print jobs would then use the final, re-stabilized, tone reproduction curve obtained after such a predetermined number of sequential plural color test sheets have been printed.

This patent application is not related to or limited to any particular one of the various possible (see, for example, various of the cited references) algorithms or mathematical techniques for processing the electronic signals from the spectrophotometer to generate or update color correction tables, tone reproduction curves, or other color controls, and hence they need not be further discussed herein.

Various possible color correction systems can employ the output signals of spectrophotometers, using various sophisticated feedback, correction and calibration systems, which need not be discussed in any further detail here, since the general concepts and many specific embodiments are disclosed in many other patents (including those cited herein) and publications. In particular, to electronically analyze and utilize the spectrophotometer or other electronic printed color output information with a feedback analysis system for the color control systems for a printer or other color reproduction system. It is, however, desirable in such systems to be able to use a substantially reduced (smaller) number of color patch samples, printed at intervals during the regular printing operations, to provide relatively substantially continuous updating correction of the printer's color renditions over a wide or substantially complete color spectra. Noted especially in that regard is the above-cited Xerox Corp. Steven J. Harrington U.S. Pat. No. 6,178,007 B1.

Color correction and/or color control systems should not be confused with color registration systems or sensors. Those systems are for insuring that colors are correctly printed accurately superposed and/or accurately adjacent to one another, such as by providing positional information for shifting the position of respective color images being printed.

Other background patents which have been cited as to color control or correction systems for printers include the following U.S. patents: Xerox Corp. U.S. Pat. No. 5,963,244, issued Oct. 5, 1999 to L. K. Mestha, et al, entitled "Optimal Reconstruction of Tone Reproduction Curve" (using a lookup table and densitometer readings of photoreceptor sample color test patches to control various color printer parameters); U.S. Pat. No. 5,581,376, issued December 1996 to Harrington; U.S. Pat. No. 5,528,386, issued Jun. 18, 1996 to Rolleston et al.; U.S. Pat. No. 4,275,413, issued Jun. 23, 1981 to Sakamoto et al.; U.S. Pat. No. 4,500,919, issued Feb. 19, 1985 to Schreiber; U.S. Pat. No. 5,416,613, issued May 16, 1995 to Rolleston et al.; U.S. 5,508,826, filed Apr. 27, 1993 and issued Apr. 16, 1996 to William J. Lloyd et al.; U.S. Pat. No. 5,471,324, issued Nov. 28, 1995 to Rolleston; U.S. Pat. No. 5,491,568, issued Feb. 13, 1996 to Wan; U.S. Pat. No. 5,539,522, issued Jul. 23, 1996 to Yoshida; U.S. Pat. No. 5,483,360, issued Jan. 9, 1996 to Rolleston et al.; U.S. 5,594,557, issued January 1997 to Rolleston et al.; U.S. Pat. No. 2,790,844 issued April 1957 to Neugebauer; U.S. Pat. No. 4,500,919, issued February 1985 to Schreiber; U.S. Pat. No. 5,491,568, issued Feb. 13, 1996 to Wan; U.S. Pat. No. 5,481,380 to Bestmann, issued Jan. 2, 1996; U.S. 5,664,072, issued Sep. 2, 1997 to Ueda et al.; U.S. Pat. No. 5,544,258, issued Aug. 6, 1996 to Levien; and U.S. Pat. No. 5,881,209, filed Sep. 13, 1994 and issued Mar. 9,1999 to Michael Stokes.

By way of further background on the subject of technology for automatic color correction for color printers or other reproduction apparatus, especially such systems utilizing feedback signals from a colorimeter or spectrophotometer (as noted, those terms may be used interchangeably herein), and/or automatically measuring the actually printed colors of test patches on printed copy sheets as they are being fed through the output path the printer, there is noted the following: the above-cited Xerox Corp. U.S. Pat. No. 5,748,221, filed Nov. 1, 1995 and issued May 5, 1998 to V. Castelli, et al, entitled "Apparatus for Colorimetry, Gloss and Registration Feedback in a Color Printing Machine," (noting especially the colorimeter detector details); the above-cited Apple Computer, Inc. U.S. Pat. No. 5,612,902, issued Mar. 18, 1997 to Michael Stokes; Xerox Corp. U.S. Pat. No. 5,510,896, issued Apr. 23, 1996 to Walter Wafler, filed Jun. 18, 1993 (see especially Col. 8 re color calibration from information from a scanned color test copy sheet as compared to original color image information); and Xerox Corp. U.S. Pat. No. 5,884,118, issued Mar. 16,1999 to Mantell and L. K. Mestha, et al, entitled "Printer Having Print Output Linked to Scanner Input for Automated Image Quality Adjustment" (note especially Col. 6, lines 45–49).

U.S. Patents of interest to color correction in general, but which may be useful with, or provide background information for, the above or other systems, include the above-cited Xerox Corp. U.S. Pat. No. 5,594,557, filed Oct. 3, 1994 and issued Jan. 14, 1997 to R. J. Rolleston et al., entitled "Color Printer Calibration Correcting for Local Printer Non-Linearities," Seiko Epson Corp. U.S. Pat. No. 5,809,213, provisionally filed Feb. 23, 1996 and issued Sep. 15, 1998 to A. K. Bhattacharjya re reduced color measurement samples; and Splash Technology, Inc. U.S. Pat. No. 5,760,913, filed Feb. 12, 1996 and issued Jun. 2, 1998 to Richard A. Falk in which a calibration image is scanned using a scanner coupled to the printing system with a personal computer.

In addition to above-cited issued patents, also noted as of possible interest to on-line color printer color control or correction systems (other than spectrophotometers per se) are Xerox Corp. U.S. Applications including: U.S. application Ser. No. 09/083,202, filed May 22, 1998 by Mark A. Scheuer, et al., entitled "Device Independent Color Controller and Method," U.S. application Ser. No. 09/083,203, filed May 22, 1998 by Lingappa K. Mestha, entitled "Dynamic Device Independent Image," (now U.S. Pat. No. 6,157,469, issued Dec. 5, 2000); U.S. application Ser. No. 09/232,465, filed Jan. 19, 1999 by Martin E. Banton, et al., entitled "Apparatus and Method for Using Feedback and Feedforward in the Generation of Presentation Images In A Distributed Digital Image Processing System," Attorney Docket No. D/98423; U.S. application Ser. No. 09/221,996, filed Dec. 29, 1998 by Lingappa K. Mestha, et al., entitled "Color Adjustment Apparatus and Method," U.S. Application Ser. No. 09/455,761, filed Dec. 7, 1999 by Sidney W. Marshall, et al., entitled "Color Gamut Mapping for Accurately Mapping Certain Critical Colors and Corresponding Transforming of Nearby Colors and Enhancing Global Smoothness," U.S. application Ser. No. 09/487,586, filed Jan. 19, 2000 by Lingappa K. Mestha, et al., entitled "Methods For Producing Device and Illumination Independent Color Reproduction," U.S. application Ser. No. 09/451,215, filed Nov. 29, 1999 by Lingappa K. Mestha, et al., entitled "On-Line Model Prediction and Calibration System For A Dynamically Varying Color Marking Device," U.S. application Ser. No. 09/454,431, filed Dec. 3, 1999 by Tracy E. Thieret, et al., entitled "On-Line Piecewise Homemorphism Model Prediction, Control and Calibration System for a Dynamically Varying Color Marking Device," U.S. application Ser. No. 09/461,072, filed Dec. 15, 1999 by Lingappa K. Mestha, et al., entitled "Systems and Methods for Device Independent Color Control to Achieve Accurate Color Proofing and Reproduction," U.S. application Ser. No. 09/562,072, filed May 1, 2000 by Lingappa K. Mestha, et al., entitled "System and Method for Reconstruction of Spectral Curves, Using Measurements from a Color Sensor and Statistical Techniques," U.S. Application Ser. No. 09/621,860, filed Jul. 21, 2000 by Lingappa K. Mestha, et al., entitled "System and Method for Reconstruction of Spectral Curves Using Measurements from a Color Sensor and a Spectral Measurement System Model," and U.S. application Ser. No. 09/566,291, filed May 5, 2000 by Lingappa K. Mestha, et al., entitled "On-Line Calibration System For A Dynamically Varying Color Marking Device,"

As further well-known background for on difficulties in color correction of printers in general, computers and other electronic equipment generating and inputting color images or documents typically generate three-dimensional or RGB (red, green, blue) color signals. These color signals may be transmitted as PDL or other device independent terms to a specific server or printer for a "RIP" (raster image process) conversion to device dependent color values, such as for the line and bit signals for the laser scanner or LED bar of the particular printer. Many printers, however, can receive four-dimensional or CMYK (cyan, magenta, yellow, and black) signals as input, and/or can print with four such print colors (although the printed images can still be measured as corresponding RGB values). A look-up table is commonly provided to convert each digital RGB color signal value to a corresponding digital CMYK value before or after being received by the printer.

Real-world printers inherently have non-ideal printing materials, colors and behaviors, and therefore have complex non-linear colorimetric responses. Also, interactions between the cyan, magenta, and yellow imaging materials exist, especially on the printed output, which result in unwanted or unintended absorptions and/or reflections of colors. Even after a printer is initially calibrated, such that one or a range of input digital CMYK values produce proper colors, the full spectrum of CMYK values and printed colors will not be or remain fully accurate. In other words, the colors requested or directed to be printed by various input signals will not be the same as the actual colors printed.

This discrepancy arises in part because the relationship between the digital input values that drive the printer and the resulting colorimetric response is a complex non-linear function. Labeling the response, or other values, as "colorimetric" can indicate that the response or value has been measured by such an instrument. Adequately modeling the colorimetric response of a printer to achieve linearity across the entire available spectrum requires many parameters. Typically, a color correction look-up table is built which approximates the mapping between RGB colorimetric space and CMYK values, as taught in various of the above-cited references. Each RGB coordinate may be typically represented by an 8-bit red value, an 8-bit green value, and an 8-it blue value. Although those RGB coordinates are capable of addressing a look-up table having $256^3$ locations, measuring and storing $256^3$ values is time consuming and expensive. The look-up table is thus typically partitioned into a smaller size such as 16×16×16 (4096) table locations, each of which stores a four-dimensional CMYK value. Other CMYK values may then be found by interpolating the known CMYK values using an interpolation process, for example, trilinear or tetrahedral interpolation.

The color correction look-up table may be built by sending a set of CMYK digital values to the printer, measuring the colorimetric RGB values of the resulting color patches outputted by the printer with a spectrophotometer, and generating the look-up table from the difference between the inputted values and the measured outputted values. More specifically, the color correction look-up table corrects for non-linearities, printing parameter variations, and unwanted absorptions of inks, so that the printer will print the true corresponding color.

After the color correction table is generated, the actual printer response may tend to drift over time. To correct for the drift, the system is adjusted or recalibrated periodically. Recalibrating the color correction table involves periodically printing and remeasuring a set of test color patches which are then compared to an original set of color patches by calibration software. Remeasuring, however, has heretofore more typically been performed manually by a scanner or other measuring device which is remote from the printer being recalibrated. For example, by removing a test output sheet from the printer output tray, placing it (stationary) on a table and sliding a spectrophotometer over it, manually or with an X-Y plotter driver, or automatically feeding the test sheet through the spectrophotometer, and storing the spectrophotometer output signals data in an associated memory to read out later, or connecting the spectrophotometer by an electrical wire or cable to the printer controller or its server to directly receive those color recalibration electrical input signals from the spectrophotometer and process them as described. The connecting cable could be replaced by known IR or RF wireless (such as "BlueTooth") connection systems, as used in PC and other electronic components connections. However, this off-line manual testing of calibration sheets assumes that the operator can properly manually identify and measure the test color sheets or patches being tested in the correct order, from the correct machine.

Once a color correction table is generated, it must be associated with the correct printer, otherwise, a different printer will be recalibrated with an incorrect correction table. An automatic, on-line, dedicated spectrophotometer color correction system does not have these problems or potential error sources.

It will be appreciated that although the specific embodiment herein is described with particular reference to such desirable applications for calibrating and/or regularly re-calibrating color printers and/or refining color correction tables, that what is disclosed herein may also find various other applications in other color testing and correction systems and industries.

As discussed, in high quality color reprographic applications, it is highly advantageous to monitor and update system colorimetric performance on-line and automatically through the use of an integrated spectrophotometer. That is, to have the printing device automatically fairly frequently generate calibration prints on otherwise normally printed sheets with color patches based on digital test pattern generations, and to have a spectrophotometer in the printer output which can read those moving sheet printed color test patches accurately to provide printed output color measurement signals, without manual intervention or printing. This requires a relatively low cost yet fast, accurate, and wide spectral range spectrophotometer capable of effectively operating in that environment, and under those conditions, without interfering with normal printing operations. That is, being of sufficiently low cost such that this enhanced feature can be provided on commercial color printers without substantially increasing the total customer cost of those printers. That is not typical for conventional laboratory spectrophotometers. The disclosed spectrophotometer embodiment may be positioned at any convenient location along the normal paper path of a printing machine. It may even be fitted into the output sheet stacker tray of various existing color printers.

A specific feature of the specific embodiment disclosed herein is to provide a color correction system for a color printer having an output path for moving printed color sheets, including printed test sheets with printed color test patches, in which a spectrophotometer is mounted adjacent to said printer output path for sensing the colors printed on said printed color test patches on said printed test sheets as said printed test sheets are moving past said spectrophotometer in said output path, and in which at least one illumination source is provided for illuminating said color test patches with different illumination spectra; wherein plural sets of plural small test patches of different colors are printed on said printed test sheets, and wherein a plural number of said plural small test patches of different colors in a said set are simultaneously illuminated by said illumination source, and wherein said spectrophotometer has a photodetector system for providing different electrical signals in response to reflected illumination from said different colors of said plural small test patches of different colors being simultaneously illuminated by said illumination source, wherein said photodetector system comprises at least one photodetector having an photodetecting area with multiple photo-sites including at least three different sets of said photo-sites having different spectral responses.

Further specific features disclosed herein, individually or in combination, include those wherein said photodetector system comprises at least one low cost commercial photodetector chip having at least three rows of small closely spaced multiple photo-sites with integral red, green and blue color filtering respectively, to provide at least three different spectral responses with at least three different electrical output signals; and/or further including an optics system for simultaneously focusing on different said portions and different said photo-sites of said photodetecting area of said photodetector a plural number of said plural small test patches of different colors in a said set of said plural small test patches of different colors being simultaneously illuminated by said illumination source; and/or wherein said at least one illumination source comprises less than 5 LEDs providing a limited number of different spectra illuminations, and a sequential actuation circuit for said LEDs; and/or wherein said photodetector system comprises at least photodetector chip having at least three rows of small closely spaced multiple photo-sites with different color filtering to provide at least three different spectral responses with at least three different electrical output signals, and wherein each of a plural number of said plural small test patches of different colors in a said set of said plural small test patches of different colors being simultaneously illuminated by said illumination source simultaneously exposes different said multiple said photo-sites in each of said three rows of multiple photo-sites with different color filtering to provide at least three different spectral responses with at least three different electrical output signals for each of said small test patches of different colors at substantially the same time; and/or a low cost high speed spectrophotometer comprising at least one illumination source for illuminating a color test target area having plural different color areas simultaneously to provide to provide simultaneously reflected light from said plural different color areas, and comprising at least one photodetector chip having a photosensitive surface area with multiple small and closely spaced photo-sites, said photodetector chip being mounted to receive, in discrete areas of said photosensitive surface area, at least a portion of said simultaneously reflected light from said simultaneously illuminated plural different color areas of said color test target area, and wherein said multiplicity of small and closely spaced photo-sites have at least three different spectral responses, and wherein said simultaneously reflected light from said simultaneously illuminated plural different color areas received on said discrete areas of said photosensitive surface area of said photodetector chip provides said at least three different spectral responses for each of said simultaneously illuminated plural different color areas substantially simultaneously; and/or wherein said multiplicity of small and closely spaced photo-sites with said at least three different spectral responses are provided by at least three rows of said photo-sites having different color filtering, and portions of all three said rows are simultaneously exposed to said reflected light from said illuminated color test target to provide said at least three different spectral responses and at least three different corresponding electrical signals substantially simultaneously for each of said plural different color areas; and/or wherein said at least one illumination source comprises a limited plural number of said illumination sources comprising less than approximately five LEDs with different spectral emissions, and a sequential actuation circuit for rapid sequentially actuation of said LEDs, for broad spectrum color measurements; and/or wherein said at least one illumination source comprises a white light illumination source; and/or wherein said spectrophotometer is a part of a color control system of a color printer with a printed sheets output path and a system for printing and moving though said same printed sheets output path color test sheets printed with multiple sets of said plural different color areas, and wherein said spectrophotometer is mounted adjacent to at least one side of said printed sheets output path of said color printer to sequentially analyze said multiple sets of said plural different color areas of said printed color test sheets printed by said printer as said printed color test sheets are moving past said spectrophotometer in said printed sheets output path of said color printer; and/or wherein said at least one photodetector chip comprises a plurality of said photodetector chips mounted arrayed around said color test target area and spaced from said color test target area to receive said reflected light from said plural different color areas of said color test target area at substantially the same angle from opposing directions; and/or further including relatively spatially insensitive optics for simultaneously focusing said reflected light from said plural different color areas of said color test target area onto respective said discrete areas of said photosensitive surface area; and/or wherein said photodetector chip is a component part for a commercially available document color imaging bar; and/or wherein said at least one photodetector chip is a component part for a document color imaging bar having at least three rows of small closely spaced photo-sites with integral red, green and blue color filters, respectively, to provide different electrical output signals from said multiple photo-sites in said three rows for the same said reflected light; and/or a method of plural color measurements of the plural colors of a color test target area having plural different color test areas, comprising simultaneously illuminating at least a portion of said plural different color test areas of said color test target area with at least one illumination source to produce reflected light therefrom, and substantially simultaneously measuring said reflected light from said plural different color test areas by exposing said reflected light from said plural different color test areas simultaneously onto plural different sets of multiple photo-sites of at least one multi-photo-site photodetector, which plural different sets of simultaneously exposed multiple photo-sites comprise at least three different types of photo-sites with at least three different spectral responses providing at least three different types of multiple output signals from each of said different sets of multiple photo-sites exposed by said reflected light from said plural different color test areas; and/or wherein said simultaneously illuminating of at least a portion of said plural different color test areas of said color test target area with at least one illumination source includes the sequential actuation of respective plural different LEDs providing plural different spectral illuminations of said color test target area for providing broad spectral analysis of said plural different color test areas; and/or wherein said at least one illumination source is a white light source; and/or wherein said at least one multi-photo-site photodetector is a photodetector chip which is normally a component part of a document color imaging bar having at least three rows of small closely spaced multiple photo-sites with integral red, green and blue color filters respectively; and/or wherein said reflected light is focused by relatively displacement insensitive optics onto said at least one multi-photo-site photodetector; and/or wherein a plurality of said multi-photo-site photodetectors are angularly spaced around said color test target area; and/or an improved method of color control of a color printer, comprising printing test sheets with multiple sets of multiple small adjacent but different color test patches in said printer, illuminating, one set at a time, at least a portion of a said set so as to simultaneously illuminate at least a plurality of said multiple small adjacent but different color test patches in said set, and simultaneously imaging the reflected said illumination of said simultaneously illuminated plurality of different color test patches onto different areas of at least one photodetector having plural differently color responsive sets of multiple photo-sites, to substantially simultaneously provide plural discrete color signals from said differently color responsive sets of multiple photo-sites from said imaging of said reflected illumination from said plural different color test patches onto said different areas, and controlling the color printing of said color printer with said plural discrete color signals; and/or wherein said illumination of said multiple sets one at a time to simultaneously illuminate at least a plurality of said multiple small adjacent but different color test patches in a said set comprises the rapid sequential illumination of plural different spectral emission LEDs; and/or wherein said at least one photodetector is a low cost commercial chip which is normally a component part of a document color imaging bar, having at least three rows of small closely spaced photo-sites with integral red, green and blue color filtering to provide at least three different spectral responses with at least three different electrical output signals; and/or wherein said illumination and said at least one photodetector are provided by an integral spectrophotometer unit mounted at one side of a printed sheets output path of said color printer for on-line color control of said color printer; and/or wherein said simultaneous imaging of said reflected illumination of a plurality of said different color test patches onto different areas of said at least one photodetector is through displacement insensitive optics providing for variable spacing of said test sheet therefrom.

The disclosed system may be connected, operated and controlled by appropriate operation of conventional control systems. It is well known and preferable to program and execute various control functions and logic with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from functional descriptions, such as those provided herein, and/or prior knowledge of functions which are conventional, together with general knowledge in the software and computer arts. Alternatively, the disclosed control system or method may be implemented partially or fully in hardware, using standard logic circuits or single chip VLSI designs.

In the description herein, the term "sheet" refers to a usually flimsy (non-rigid) physical sheet of paper, plastic, or other suitable physical substrate or print media for images, whether precut or web fed. A "copy sheet" may be abbreviated as a "copy," or called a "hardcopy." Printed sheets may be referred to as the "output." A "print job" is normally a set of related printed sheets, usually one or more collated copy sets copied from a one or more original document sheets or electronic document page images, from a particular user, or otherwise related.

As to specific components of the subject apparatus, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Various of the above-mentioned and further features and advantages will be apparent from the specific apparatus and its operation described in the example below, and the claims. Thus, the present invention will be better understood from this description of a specific embodiment, including the drawing figures (approximately to scale, except for schematics) wherein:

Figure 1:
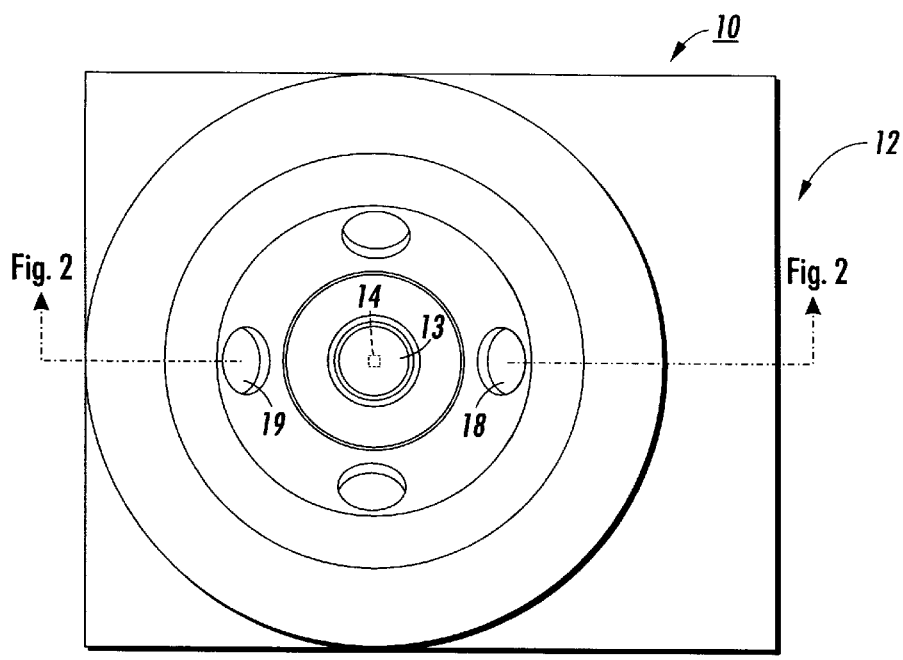
FIG. 1 is a top view of one example or embodiment of a spectrophotometer incorporating one example of the subject plural colors detection system.
Figure 2:
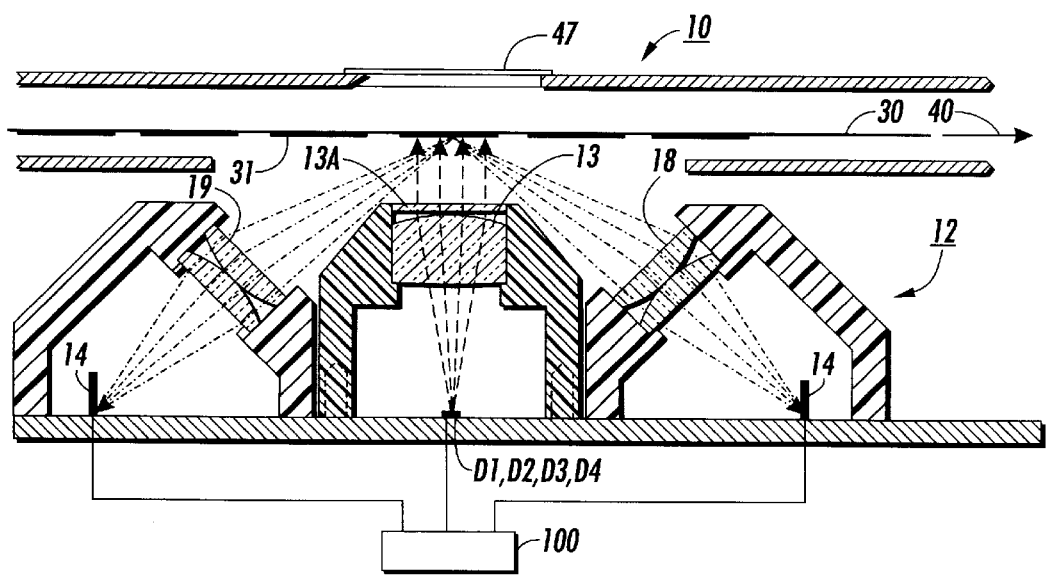
FIG. 2 is a cross-sectional view taken along the line 2—2 of the spectrophotometer of FIG. 1 shown simultaneously measuring plural colors of a plural colors test patch of a test sheet moving in an exemplary color printer output path.
Figure 3:
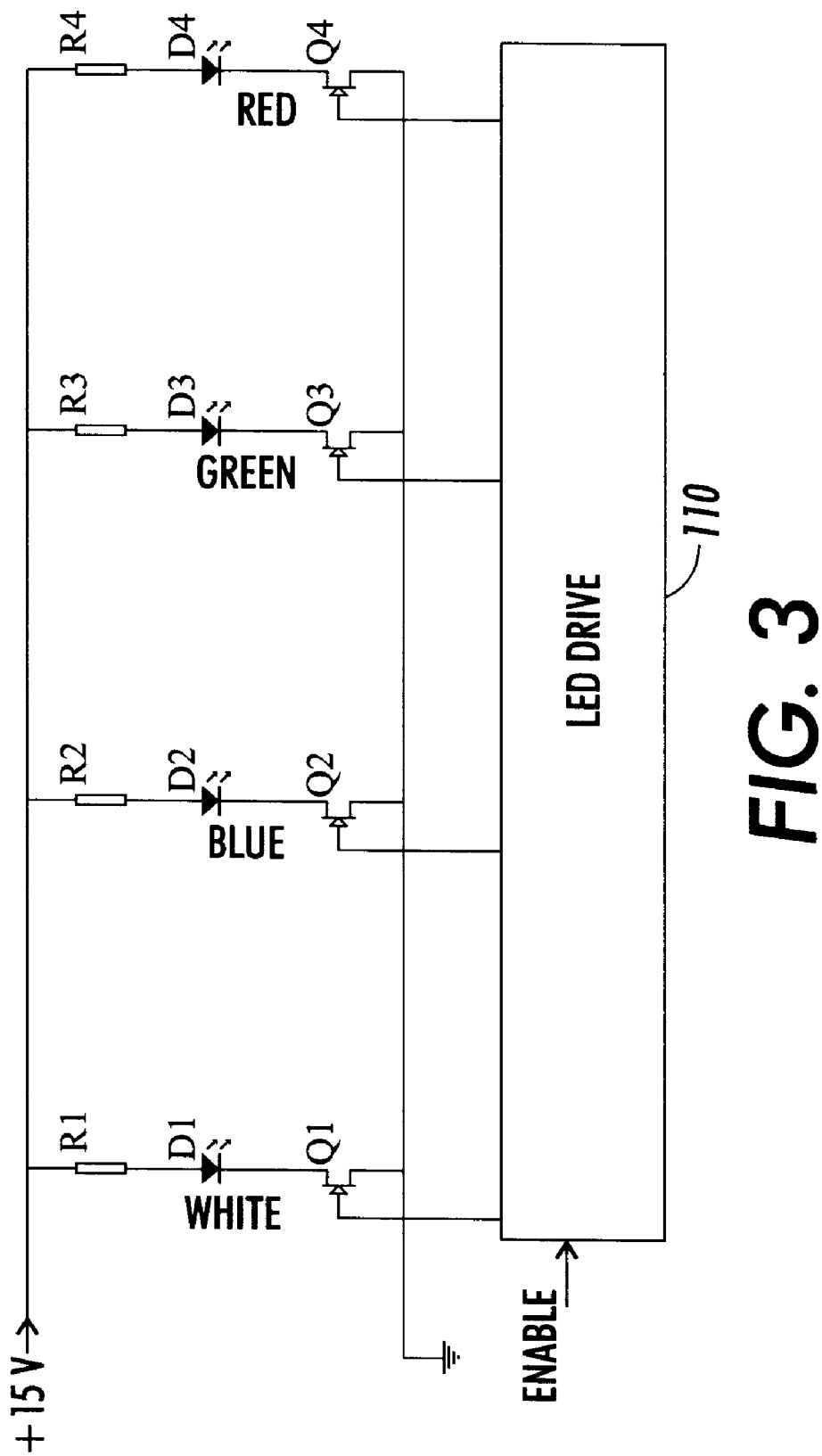
Figure 4:
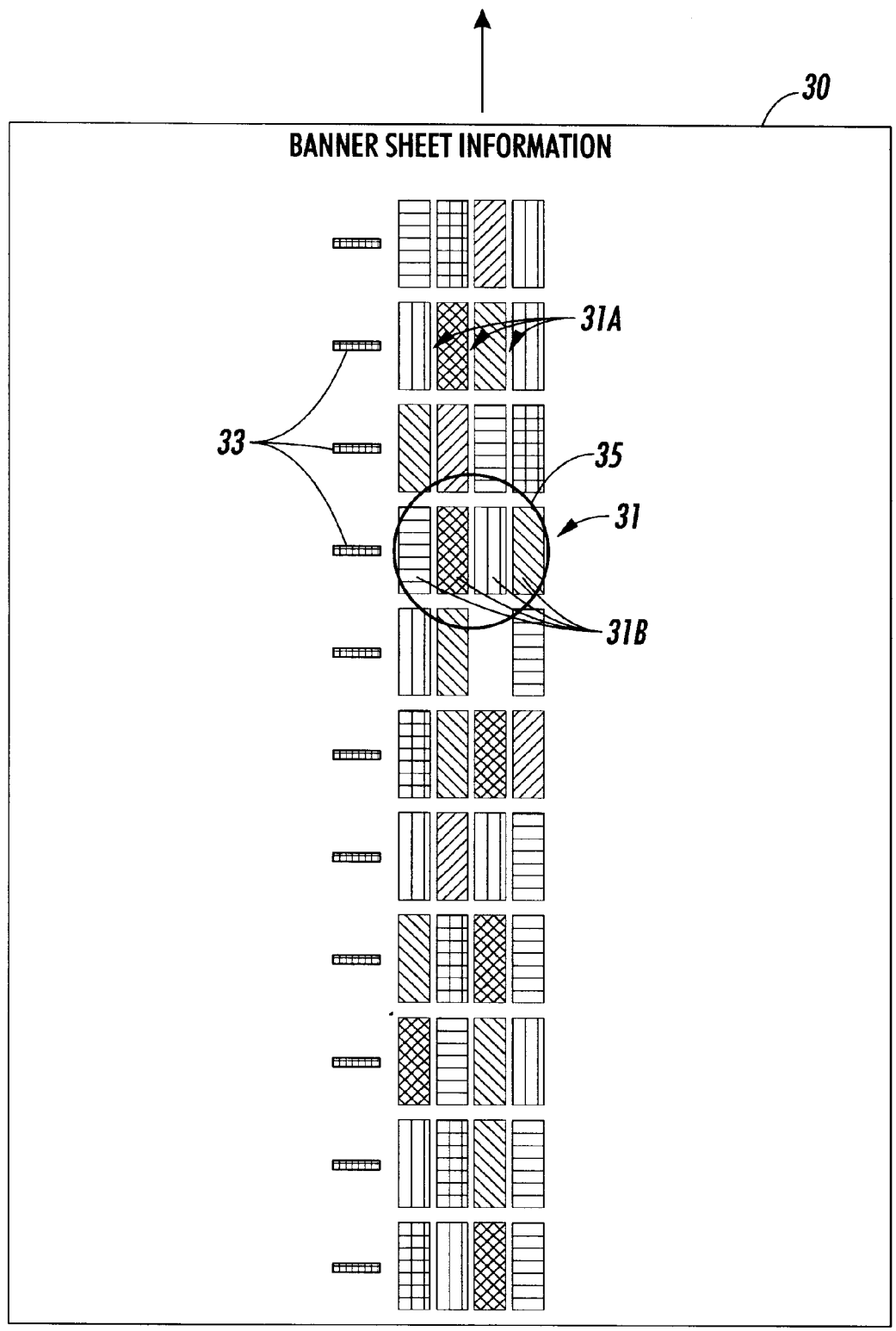
Figure 5:
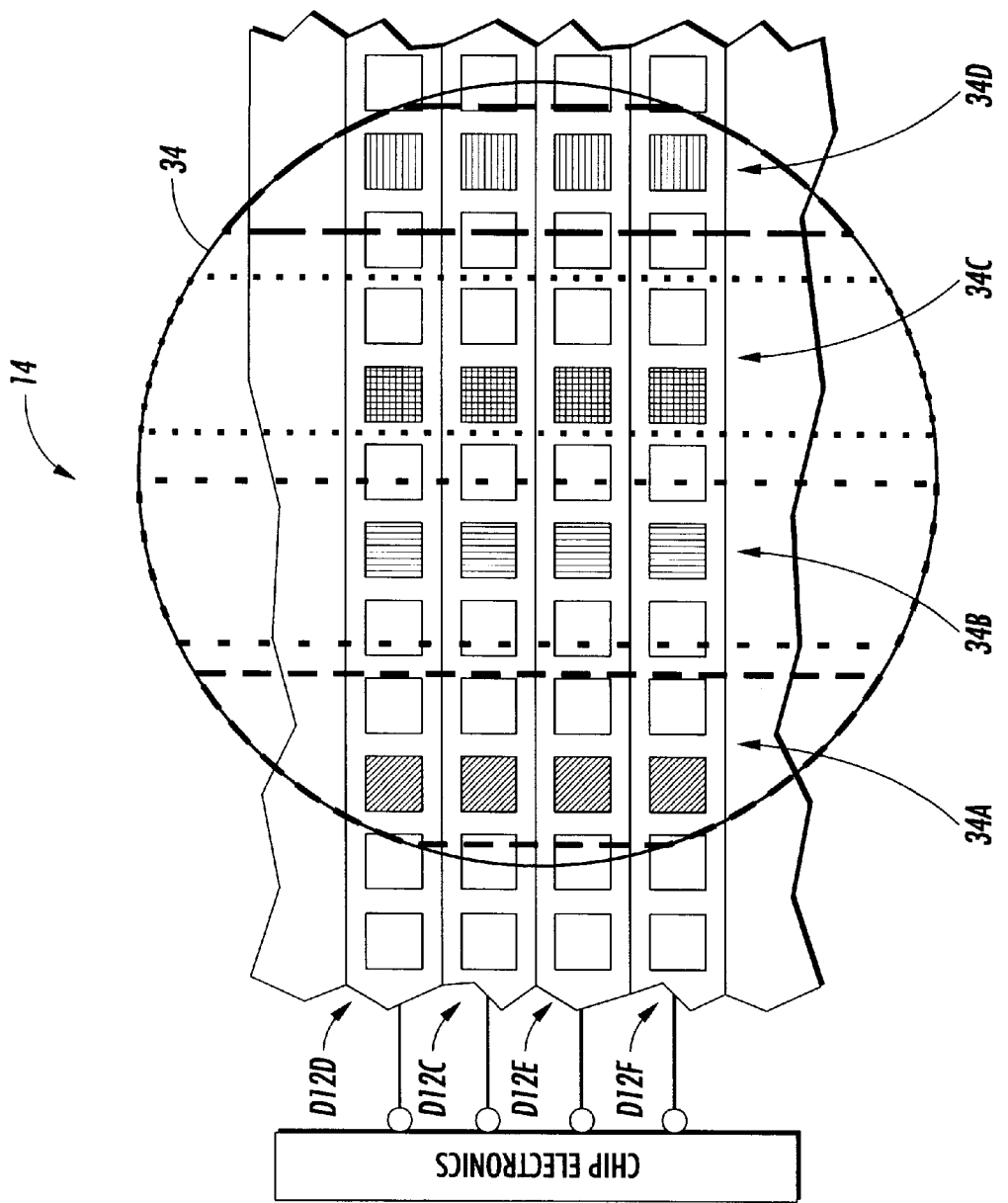
Figure 6:
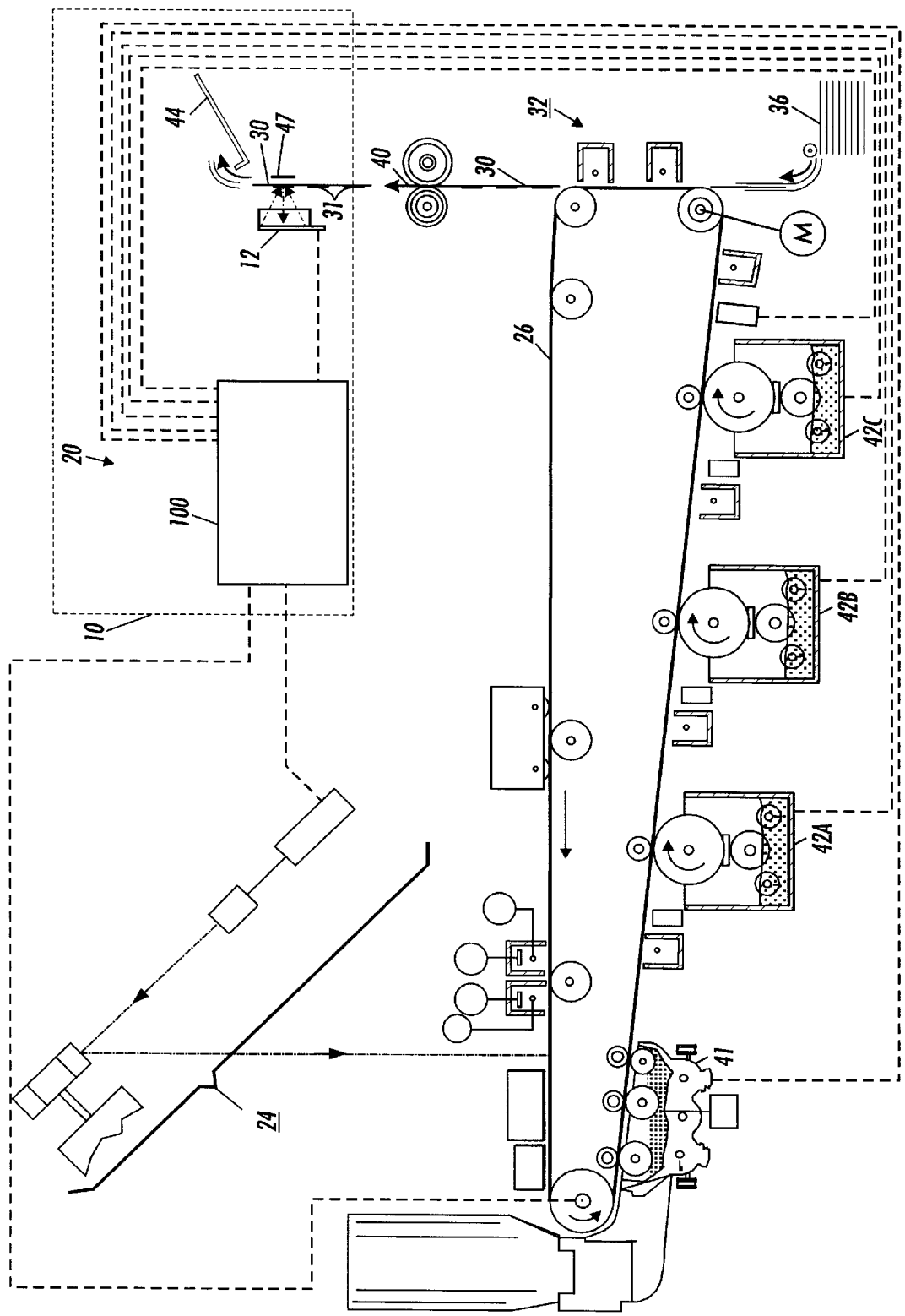
Figure 7:
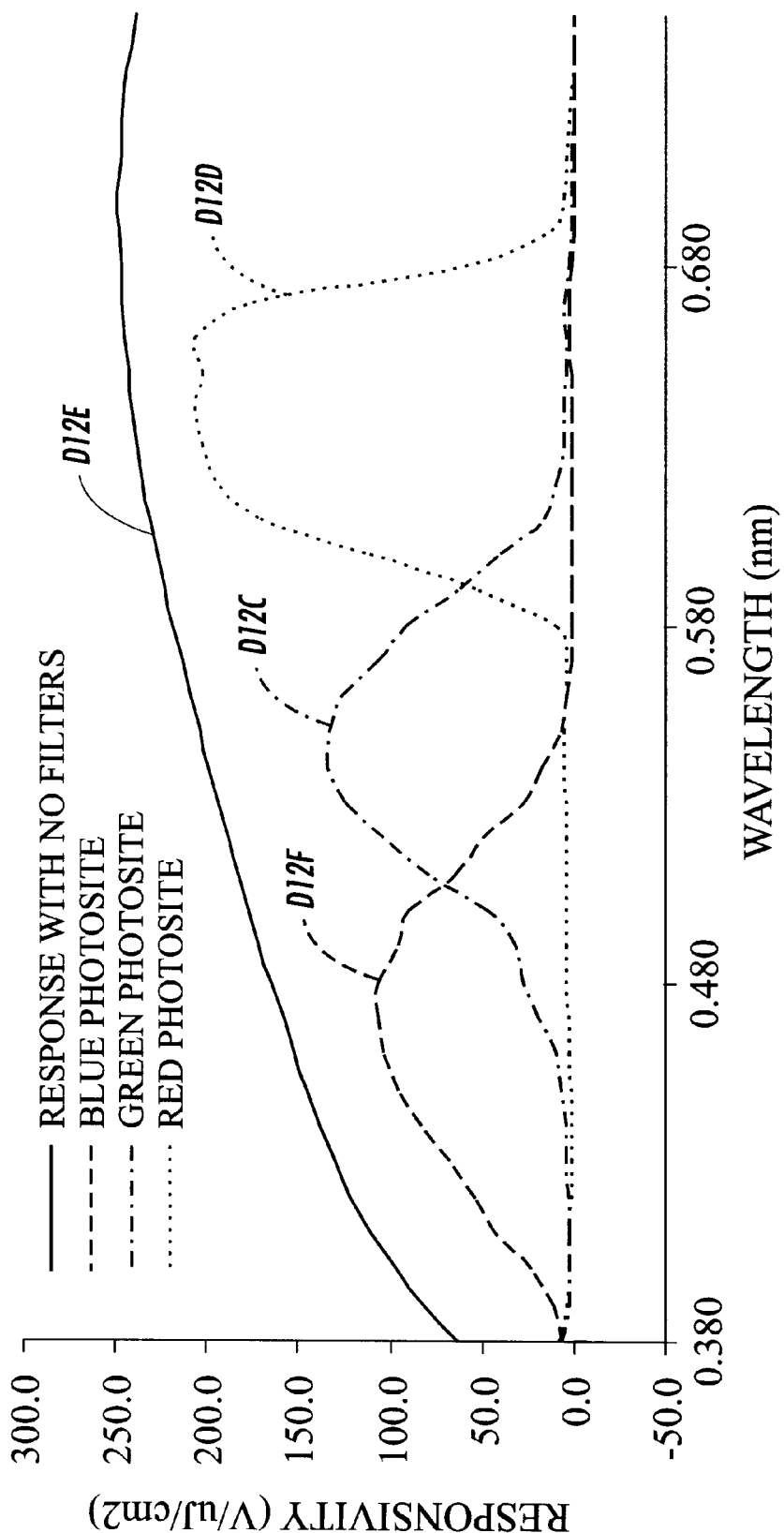
Figure 8:
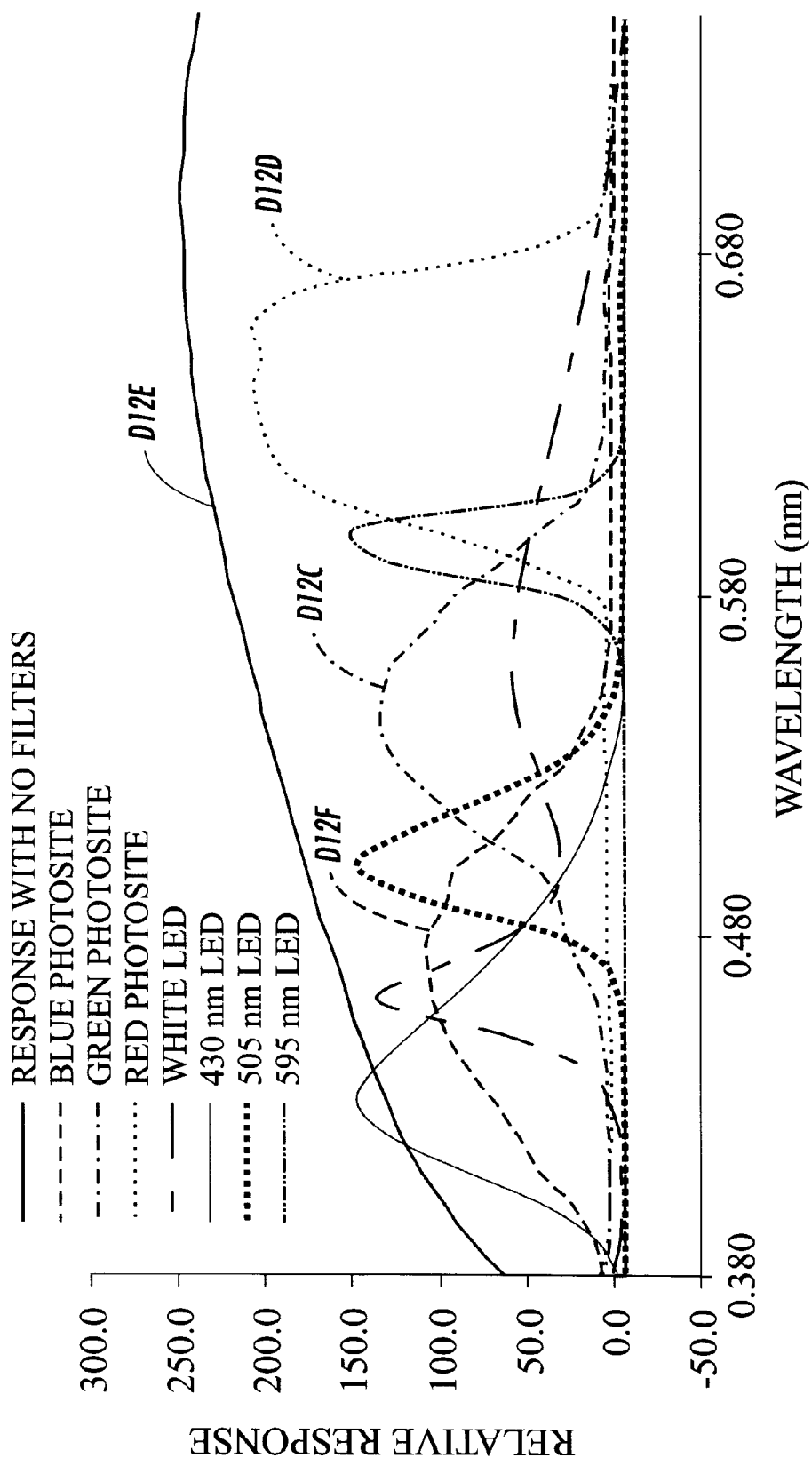
Figure 9:
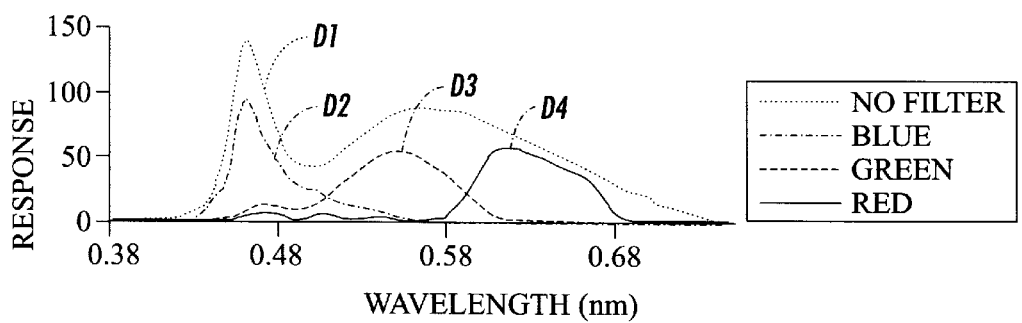
Figure 10:
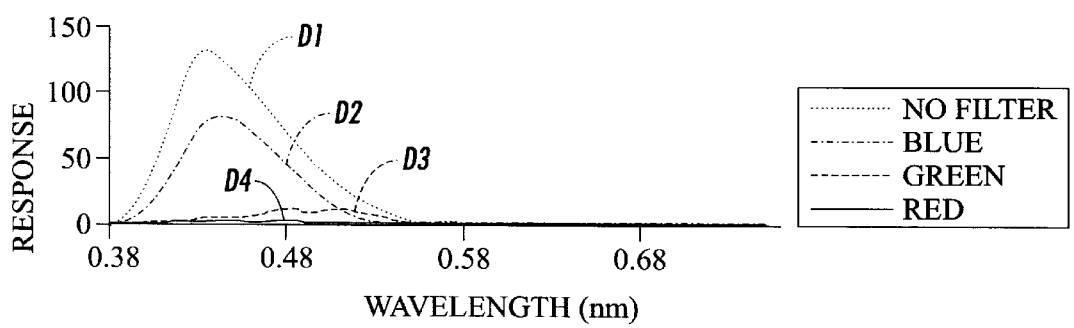
Figure 11:
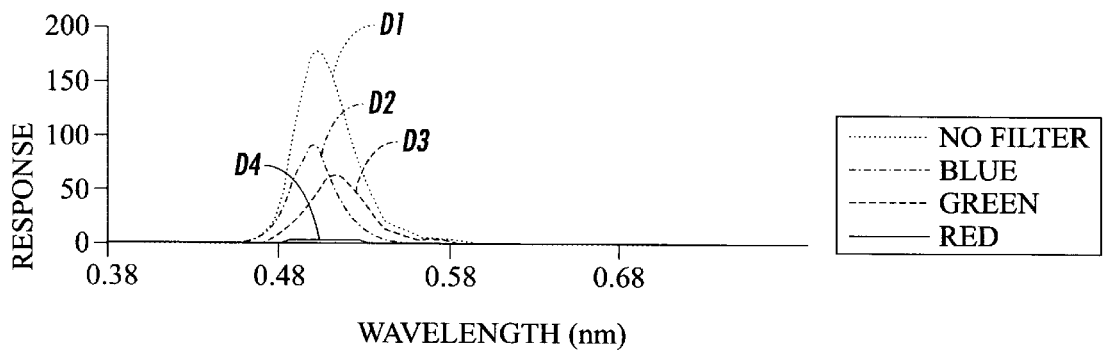
Figure 12:
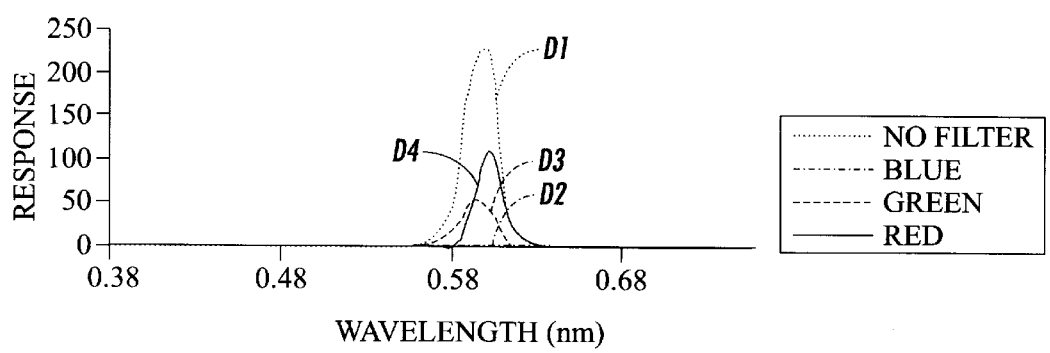

FIG. 3 schematically shows one example of driver circuitry with which the LEDs of the exemplary spectrophotometer of FIGS. 1 and 2 may be operated;

FIG. 4 shows one example of a banner or other test sheet, which may be printed by an exemplary color printer, with plural color test patches (enlarged and not to scale here) being individually read by the spectrophotometer of FIGS. 1 and 2, with the different colors represented by their U.S. Patent Office standard black and white cross-hatching symbols, and with the area defined by the illustrated circle representing an exemplary illuminated test target area of a plural colors test patch which is being simultaneously illuminated by an LED light source;

FIG. 5 is a schematic and greatly enlarged partial plan view of an exemplary silicon color image sensor array chip (preferably part of a commercially available document imaging bar) utilized in the exemplary spectrophotometer of FIGS. 1 and 2, with three rows of photosensor sites transmissively filtered red, green and blue, respectively, in a known manner, for respectively sensing spectra in those three separate colors, and also showing an (optional) fourth row of photosensor sites without filters for white light sensing, and with the area defined by the circle illustrated thereon representing an exemplary area of this sensor array chip being illuminated by the illumination reflected from the illuminated test target area, and also shown here are plural separated phantom-line boxes (within that circular exposed area) showing the separated areas of multiple exposed photo-sites which are seeing the separate images of the separate (but simultaneously exposed) different color areas of the exposed area of the test patch of FIG. 4;

FIG. 6 schematically shows in a plan view one example of an otherwise conventional color printer, shown printing the color test sheets of FIG. 4 and sequentially reading those test sheets with the spectrophotometer of FIGS. 1 and 2 as the test sheet are moving normally in the normal output path of this printer, with the spectrophotometer shown here mounted at one side of that sheet output path opposite from an opposing calibration test target surface;

FIG. 7 shows in a plot of wavelength (horizontal) versus relative response (vertical) the four exemplary spectral responses of the exemplary image sensor array chip of FIG. 5, respectively for its unfiltered sensors (the solid line), blue filtered sensors (the dashed line), green filtered sensors (the dot-dashed line) and red filtered sensors (the dotted line);

FIG. 8 is similar to FIG. 7 but shows superimposed on the curves of FIG. 7 the spectral outputs of four different exemplary LED illumination sources which may be integral to the exemplary spectrophotometer of the above Figs (as described and shown in the table below), namely a white LED (the dash-long-dash line), a 430 nm LED (the thin line), and 505 nm LED (the line of squares), and a 595 nm LED (the dash-dot-dot dash line); and FIGS. 9, 10, 11 and 12, respectively, sequentially show the combined response of all four different sensors of the chip of FIG. 5 as sequentially exposed to illumination from only one of the four different LEDs of FIG. 8, namely, in FIG. 9 the white LED, in FIG. 10 the 430 nm LED, in FIG. 11 the 505 nm LED, and in FIG. 12 the 595 nm LED.

With reference to the Figs., disclosed in this embodiment is a color measurement system 10 with a spectrophotometer 12 able to commonly illuminate a test patch or other target area having more than one test color, and also able to simultaneously separately detect and separately analyze (so as to provide separate output signals) those differently colored areas of that exposed test patch area.

As shown in FIG. 4, a relatively small white space (or, alternatively, dark lines) may be provided laterally between those different colors. That is, transverse to the spectrophotometer scanning direction of the test sheet bearing the test patch areas. Multiple spaced test patch areas of such plural areas of plural colors extend in the scanning direction. Here in this embodiment the scanning direction is the direction of movement of the test sheet in the printer sheet path past the spectrophotometer, hence the test patches are printed extending along the sheet in that direction. However, as also shown in FIG. 4, each such test patch area here can also have plural discrete and differently colored areas extending transversely to the sheet movement direction, to substantially expand the number of differently colored test areas which may be effectively printed and exposed on the same test sheet.

As will be further described, the simultaneously reflected images of at least a portion of the simultaneously plural color test areas may be simultaneously and common-optics focused onto an overall exposure area 34 (of multiple photo-sites) of one or more spectrophotometer photodetectors chips 14 as in FIG. 5. That photodetector exposure area 34 here encompasses three or four rows of differently color-responsive photo-sites (cells). The selected chip 14 will normally already have three rows of multiple photo-sites D12D, D12C, D12E, each with different color filtering for different color responsiveness, typically red, green and blue filtering as previously noted.

The simultaneously reflected and focused illuminations of the plural different color test patch areas thus will have at least three different sets of photo-site signal responses from the chip 14 of FIG. 5 (plus responses to any separations between the colored test patch areas by white or dark areas which are differently exposing, or not exposing, intervening photo-sites). These different color images on the photodetector chip are electronically photo-distinguishable from one another, even though simultaneously exposed and simultaneously imaged on the same photodetector chip, by relatively simple output signal analysis of the different photo-sites (cells) of the chip. Such as thresholding and averaging of the cell signals from the different color test patch areas to produce different sets of output signals corresponding to the exposed areas of different colors To express that in other words, as will be further described, the disclosed or other exemplary spectrophotometer, in the exemplary system disclosed herein, can simultaneously distinguish and separately read plural different color test patches. The different color areas may be printed on the test target sheet side by side in multiple columns along the direction of the paper as shown in FIG. 4. With a parallel read-out system as described, or otherwise, the number of readable test patches per page can be greatly increased, resulting in less required test pages and faster colors measurements for the same optical and electronic assembly.

Enabling more color tests per test sheet can substantially reduce the number of test sheets that need to be printed by a color printer, especially for initial printer calibration, but also for re-calibrations for changes in print media or other printer color accuracy changes. This can save paper and also improve color printer productivity by reducing interruptions of regular print jobs for printing test sheets.

By way of further background, normally color calibration and characterization of a printing process including gray balance requires the measurement of multiple colors around the neutral axis and around the gamut. For example, initial calibration and characterization processing by "off-line" means with color measurements of about 1600 to 2000 color patches may be required. The calibration and characterization process may involve printing calibration targets on multiple pages with different numbers of patches, depending on the type of algorithm. Although this long initial calibration and characterization process may not necessarily need to be done on a daily basis, it may be desirable to repeat the process whenever an optimized color output is required, for example, when the customer wishes to accommodate a custom or new print media. The prior art calibration and characterization processes may require printing of a large number of test pages to provide a sufficiently large enough number of discretely readable different color test patches in such instances, which wastes paper. It can also reduce printer productivity due to the increased time required for printing and measuring all of the colors printed on the multiple printed test sheets.

Each of the exemplary photodetector chips 14 of FIG. 5 can resolve, for example, 157×236 pixels per cm provided by 248 photosensitive cells with a 63.5 micro-meter pitch between cells in each of three rows. Thus, a relatively small total exposure area can resolve plural different color images therein, as taught in this embodiment. The schematically illustrated photosensitive cells of these chips 14 typically have integral integration circuit hardware to accumulate their photon-generated charges, amplify those signals, and provide digitized output signals for each cell. As will be further discussed, optionally a fourth row of photo-sites may be added to these chips, for white light or other sensing.

It has been discovered that these multiple cells imaging chips 14 can be used to accurately and rapidly measure multiple different color patches substantially simultaneously. Especially with appropriately printed test sheet color patches.

The exemplary test sheet 30 color test patches layout shown in FIG. 4 is one such example for real time measurements. It is a modification of the normal line of relatively large and spaced apart one-color test patches extending in the movement direction of the test sheet relative to the spectrophotometer, as shown for example in various of the above cross-referenced applications or cited references. As shown in FIG. 4, each (normal large single color) test patch area 31 here is modified to contain small multiple different color sub test patch areas 31B. As shown, these test patches 31B may comprise thin laterally spaced columns of different colors, closely enough spaced together so that at least several such different color test areas are within the exemplary illumination and viewing area 35 of the spectrophotometer 12. Appropriately small unprinted spaces providing separations 31A may be provided as shown between these respective columns of different test patches 31B to provide distinctive separations between these individual color areas 31B. Alternatively, or additionally, printed boundaries may be used as such separators. The separations 31A also insure that the printer will not overlap the printing of the edges two different adjacently printed colors. However, if the colors of even directly adjacent patches 31B are sufficiently different, such separations or boundaries may not be required for the spectrophotometer 12 multiple photo-sites imager chip 14 and its connecting software to discriminate between the respective test patches and also to electronically delete and ignore the edge areas of the patches 21B.

FIG. 4 schematically shows one example of a test sheet 30 printed with such multiple color test patches 31B in closely adjacent patch columns (parallel rows). These patch-columns 31B are shown here with a white (unprinted) column boundary about 1 mm wide.

As each plural color major test patch area 31 moves past the spectrophotometer 12 viewing area, and an LED is illuminated, an image of at least a part of the illuminated area 35 is focused by the spectrophotometer 12 optics on all of the cells of the imaging chip 14 that are within its exposed area 34. Data may then be collected from the output signals from each of the photo-site cells within that exposed area 34, and stored in a memory data bank (in the controller 100 or elsewhere) for further processing, during the brief time period in which an LED is turned on. (Suitable exemplary LEDs and their actuations are described elsewhere herein.) The signals from the fully exposed cells specific to each of the respective patch-column areas 31B of interest may be readily individually separated from the memory data bank to extract different individual spectral or trichromatic quantities corresponding to the different individual color areas 31B, as described. This provides measurements of more than one color simultaneously, effectively in parallel. Thus, the spectrophotometer 12 provides increased color measurement bandwidth and effective speed.

Note that the substantially real time data from sequential multiple test patch color measurements by the spectrophotometer 12 may be buffered and analyzed in batches of preset or limited numbers of test patch data. measurements.

As further described later, fiducial marks 33 may also be simultaneously printed on each printed test sheet 30 and used to trigger the sequential illumination of the LEDs (D1, D2, D3, D4 in the example of FIGS. 2 and 3) after the color patches area 31 to be measured associated with that fiducial mark 33 arrives in the vicinity of the sensor viewing area. Such fiducial marks are not mandatory, but they can accurately trigger the illumination circuitry, such as that of FIG. 3, even if the velocity of the moving test sheet 30 varies or becomes unpredictable.

The area 35 defined by the circle in FIG. 4 illustrates an exemplary test target illumination and viewing area of this particular spectrophotometer 12 when any of these LEDs D1, D2, D3, D4 are turned on. This illumination by the LEDs is reflected and collected on the photo-sites of the chip 14 through sensor optics, preferably optics which are relatively insensitive to spatial and angular variations of the test sheet 30 surface, as further described hereinbelow and in the above cross-referenced applications.

As the test sheets 30 move normally in the normal output path of the printer, their respective sets 31 of plural test patches 31B are sequentially exposed. The active image area or region 34 of the chip 14 receives light reflected from the illuminated viewing area or region 35 of the those plural patch-columns 31B.

FIG. 5 shows schematically, with respective exemplary phantom outlined areas 34A, 34B, 34C, 34D within that chip 14 exposed area 35, the respective image areas of respective different patch-column color areas 31B. These respective different color image areas 31B are falling on different respective column shaped areas (such as 34A, 34B, 34C, 34D) of multiple photo-sites of the chip 14. Each such separate test patch 31B has a separate image area 34A, 34B, etc. exposing a large number of cells in all of the three (or four) the differently color-filtered rows D12D through D12F. Thus, each individual color test area image may be separately analyzed by the different signals from different area sets of differently color-filtered cells, as further described herein.

Although due to drawing space limitations only a limited number of such different color parallel analysis areas 34A, 34B, etc. are shown in FIG. 5, there can be more. As one specific example, a test target viewing aperture of only about 10 mm could individually discriminate and read as many as 8 different color columns 31B per test patch 31 at once using approximately 1 mm wide individual color test areas 31B separated by a space boundary of about 0.1 mm.

The processing electronics may readily identify those patch boundaries from their distinct chip 14 cell outputs, and/or subtract cell data from adjacent the edges of these multi-pixel image areas. That can be done in addition to thresholding out low-level signal data from only partially exposed cells at the edges of exposed areas. Desirably the electronics will average the large number of exposed pixels within each row D12D-D12F of pixels within each color patch 31B image area 34A, 34B, 34C, etc., to provide a more robust measurement.

Thus, for example, for a desired color characterization or partial re-calibration involving the testing of 300 different color patches, up to 80 color patches could be printed and read per page by simultaneously exposing and reading 10 patches 31B per patch set 31. That increased measurement bandwidth could reduce test sheet 30 printing and reading to only 4 pages in that case. If the data acquisition speed is doubled to read 160 different color patches per page then only two test pages need be wasted to provide such a 300 test patch complete in-line based characterization. Hence, speed enhancement is directly proportional to the number of parallel patches 31B per patch-column set 31 being simultaneously printed, exposed and read.

We will now refer in further detail to the specific exemplary embodiment of a color sensing system 10 with a spectrophotometer 12 as shown in the above-described Figures, noting first FIGS. 1–4. As variously previously discussed, this spectrophotometer 12 embodiment (or alternatives thereof) is particularly suited to be part of a highly effective yet economical on-line or "real time" color printing color calibration or correction system, which can regularly measure the actual colors currently being printed by a color printer such as 20 of FIG. 6 on banner or other printed test sheets such as sheet 30 of FIG. 4, as compared to the intended or selected, or "true" colors of the electronic document images being inputted to the printer 20 for printing. However, as also noted above, the disclosed spectrophotometer 12 is not limited to that disclosed combination, application or utility.

In these spectrophotometer 12 embodiment, only a few LEDs (e.g., only three or four, such as D1, D2, D3 and D4) of appropriate different color spectral emission outputs need be utilized to sequentially illuminate an area 35 of the exemplary color test targets 31 on the exemplary test sheets as in FIG. 4. Furthermore, in the spectrophotometer 12 the reflected illumination level is not detected by a single photocell. Instead, it is detected by multiple spectral response photo-sites of a low cost color image sensor array chip 14, as in the example of FIG. 5, having rows of closely adjacent plural color sensors (photo-sites D12F, D12E, D12C and D12D) with respective plural different integral color filtering (none, blue, green and red) providing plural different spectral sensitivities, and plural parallel output signals, rather than a single output signal from an individual (single cell) photosensor. The respective different color output LEDs D1, D2, D3 and D4 may be switched on in a predetermined sequence (as shown in FIG. 3 or otherwise) to provide plural specific different spectral reflectance measurements within the visible wavelengths, as illustrated in FIGS. 7–12. This provides a fast and low cost general color sensing solution.

If desired, those spectral measurements of an area of a test target may be converted to provide a true broad reflectance spectra, through known or other reconstruction and extrapolation algorithms. Both the number and spectra of the LED illuminators and the photosensor sites may be varied, where appropriate, and are not necessarily limited to the specific numbers and specific wavelengths of this specific embodiment example.

It will be noted especially with respect to these descriptions of imaging chips, that the terms "photosensor sites," "photo-sites," "photosensitive cells," "cells," "detectors," or "sensors" are variously used interchangeably in descriptions herein, as in the art, unless otherwise indicated.

As previously noted, commercial mass-produced low cost document imaging bars are typically formed by edge butting together a plurality of individual imaging chips, each having multiple tiny and closely spaced photo-sites, as schematically shown in the FIG. 5 enlarged view example of such chip 14. Typically, each such chip 14 has three rows of such photo-sites (D12D, D12C and D12E here) manufactured with integral filters for red, green and blue, respectively. Also, each chip 14 typically has integrated electronics; sample and hold circuitry, etc. The spectrophotometer 12 desirably utilizes at least one (or more, as in 12', depending on the spectrophotometer design) of these low cost individual imaging chips 14. It is suggested here that these chips 14 may be obtained from a manufacturer before they are fastened together into a document imaging bar.

As one example of such a known document imaging bar, it may be made from twenty of such individual imaging chips 14, with each chip 14 being 16 mm long. Each such chip can read 400×660 pixels, provided by 248 photosensitive cells, with a 63.5 micro-meter pitch between cells. The cells are in three parallel rows, with filters for red, green and blue in the respective rows, as shown in the example of FIG. 5. These chips are made with integral electrical leads and connecting electronics already provided to all of these 248 photo-sites.

If desired, and as also illustrated in the FIG. 5 example, another such row of photo-sites, D12F, may be added to these chips, for white light (broad spectrum) sensing, by a relatively simple modification. That is, by simply adding one more such parallel row of cells in the same silicon semiconductor manufacturing steps (or otherwise) to provide another row of otherwise identical or similar photo-sites, but having no color filtering layer formed over the cells. Alternatively, a different filter may be superimposed on the photo-sites of that added fourth row. Alternatively, the chip may be made with the same existing three rows of cells, but with every fourth cell in each row made without any filter. Or, every fourth cell in each row may be made a different filter. Some aperturing (exposed area reduction, such as by partial masking) may also be provided if desired for the unfiltered cells.

The cost of a suitable image sensor chip, as is, or modified as described, may be considerably lower than a non-commercial photosensor. It can also provide a much higher level of circuit integration. Thus, a much more cost-effective spectrophotometer can be made therefrom than from individual photosensors. Although such chips normally provide a serial output from the photo-sites, alternatively, parallel sensing outputs can be provided.

As indicated above, the exemplary color image sensor chip 14 may differ somewhat from a conventional document color image sensor array or bar in that some of the photo-sites (D12F) on the color image sensor array may be left uncovered, without any color filter layers. By doing so, a fourth, broadband, spectral measurement i's enabled from those unfiltered photo-sites along with the three different spectral measurements that the chip normally provides from its three differently colored filter covered photo-sites D12E, D12C and D12D. As noted, while commercially available color image sensor array chips typically have three rows of photo-sites that are coated with three different color filter layers; red, green and blue, thus providing a three color spectra measurement capability, these same sensor array chips can be modified at low cost by simple modifications to provide an additional fourth spectral measurement capability. That is, modified so that some of the photo-sites are not color filtered. A broad spectrum illumination source, such as a white light LED, may be used therewith in a spectrophotometer configuration, as further described herein.

As shown herein, a spectrophotometer with a suitable combination of a relatively small number of plural LEDs plus plural simultaneously exposed photo-sites, with an appropriate LED switching sequence to turn the LEDs on and off, can rapidly provide a large number of test target color measurements. As the number of measurements is so increased, the color measurement capability also becomes more accurate.

Depending on the particular color correction or calibration system needs, different numbers of LEDs can be used. However, it has been found that only a few LEDs having spectral output covering the sensitivity ranges of only two or more different types of photo-sites, plus a white LED or other light source, can provide a low total components count, and thus a lower cost, spectrophotometer, yet provide a relatively large number of spectra measurements.

This can be further understood by reference to the exemplary spectral curves shown in FIGS. 7–12 and their above Fig. descriptions. In FIGS. 7–12 the respective curves corresponding to exemplary LEDs have been labeled with the same reference numbers of the exemplary LEDs, D1, D2, D4 or D5, as those same reference numbers are used in the exemplary circuit of FIG. 3, for convenience and illustrative clarity.

As noted, FIG. 5 is a schematic and greatly enlarged portion of a exemplary color image sensor array chip 14 which may be utilized in the exemplary spectrophotometer 12 of FIGS. 1 and 2. Show in FIG. 5 is an exemplary illuminated area 34 thereof. This area 34 is illuminated by LED illumination reflected from a illuminated test target 31 area 35 in FIGS. 2 and 4, and through the lens system 13 of FIG. 2, to simultaneously illuminate multiple photo-sites in the four rows of the chip 14. Those simultaneously illuminated photo-sites include the red, green, blue photo-sites D12D, D12C and D12E, and also the unfiltered photo-sites D12F if they are provided on the chip 14.

The Table below illustrates examples of the numbers of spectral measurements that can be made with combinations of different numbers of exemplary LEDs and a chip 14 with three, or four, differently filtered photo-sites:

| LEDs | | Number of Spectral Measurements | |
|---|---|---|---|
| | | With 3 Color (R,G,B filters) | With 4 Color (R,G,B filters + no filter) |
| Types | Number | Image Sensor | Image Sensor |
| White | 1 | 3 | 4 |
| White, + 595 nm or 505 nm | 2 | 5–6 | 7–8 |
| White, 595 nm, 505 nm | 3 | 7–9 | 10–12 |
| White, 595 nm, 505 nm, 430 nm | 4 | 8–12 | 12–16 |

It may be seen from the last (bottom line) example of this Table that with a four color image sensor chip 14 (with unfiltered photo-sites in addition to red, green and blue filter photo-sites), that at least 4, 3, 3 and 2 (12 total) sets of spectral measurements can be obtained by detecting a color test target 31 illumination by only four LEDs (white, 595 nm peak, 505 nm peak and 430 nm peak). Thus, one can see that at least 12 spectral combinations can be measured using a spectrophotometer having only four LEDs and a single, low cost, multipixel (multiple photo-sites) image sensor array (chip) 14. Additionally using the lower-level signals (e.g., D3 in FIGS. 10 and 12) up to 16 spectral combinations can be measured in this example.

Integration times used with various rows of the image sensor array chip 14 can be independently controlled to match the LED power levels to get suitable output signals from the sensor array.

As discussed, some of the photo-sites in one or more of these rows are desirably left uncovered (with no color filters) to get four spectral outputs from an otherwise conventional three row image sensor array. In general, the photo-sites that are not covered with color filters will provide a much larger output signal than those that are covered with filters. To compensate, part of the sensing area of these uncovered (unfiltered) photo-sites can be optionally coated in manufacturing with an opaque material or multiple layers of all three color filter layers to reduce their light sensitivity.

Any or all of the outputs of the sensor chip 14 may, of course, be calibrated/reconstructed to provide true reflectance values. For example, as in the above-cited U.S. application Ser. No. 09/562,072, filed May 1, 2000 by Lingappa K. Mestha, et al., entitled "System and Method for Reconstruction of Spectral Curves, Using Measurements from a Color Sensor and Statistical Techniques,"

It may be seen that a novel spectrophotometer 12 is disclosed which combines the spectral differentiation capabilities of a low cost plural spectra image sensor 14 with the spectral outputs of a relatively small number of different LEDs to enable a cost effective, high performance, spectrophotometer. The following and/or other advantages may be provided: multiple measurements can be made and outputted in parallel corresponding to three or four different color image sensor outputs in parallel; cost can be reduced by reducing the number of LEDs and having lower detector and detector electronics costs; and the integration time of the three or four rows of a three or four row image sensor array can be adjusted independently to match the power levels of different LEDs.

Referencing the first line of the above table, an alternative application, function, or option is to turn on, and leave on, only the white illumination source, for all of the color test patches being read at that time, to provide a "calorimeter" function of RGB values from the chip 14 outputs.

Describing now the exemplary operation of the exemplary color sensing system 10 using an exemplary spectrophotometer 12, certain aspects thereof are also described in above-cited references and the above cross-referenced U.S. application Ser. No. 09/535,007, filed Mar. 23, 2000, by Fred F. Hubble, III and Joel A. Kubby, In the illustrated example here, the spectrophotometer 12 may be utilized with circuitry, such as that of FIG. 3, or otherwise, to accurately read reflected light from one or more different color test patches such as 31 printed on moving color test sheets 30 such as that shown in FIG. 4. The test sheets 30 may be conventionally printed on various print media such as conventional print papers or plastics, preferably the same print media as the planned or concurrent print job itself. The color test patches 31 may be printed in the same manner and by the same print apparatus as the regular print jobs by any of various different conventional color printer or printing systems, of which the xerographic printer 20 of FIG. 6 is merely one example.

As will be further described, the disclosed spectrophotometer 12 can accurately read the colors of the test patches 31 even though the test sheets 30 are variably spaced from the spectrophotometer 12 during their color measurements, and are moving. Thus, the color measurements are not affected by normal variations in sheet surface positions in a normal paper path of a printer. This allows the simple mounting of the spectrophotometer 12 at one side of the normal printed sheets output path 40 of the printer 20 (or various other color reproduction systems).

Briefly first describing the exemplary color printer 20 of FIG. 6 in more detail, it is schematically illustrating an otherwise conventional xerographic laser color printer, details of various of which will be well known to those skilled in that art and need not be re-described in detail herein. Examples of further descriptions are in the above-cited Xerox Corp. U.S. Pat. No. 5,748,221, etc., and other art cited therein. A photoreceptor belt 26 is driven by a motor M and laser latent imaged or exposed by a ROS polygon scanning system 24 after charging (or an LED bar). The respective images are developed by a black toner image developer station 41 and/or one or more of three different color toner image developer stations 42A, 42B, 42C. The toner images are transferred at a transfer station 32 to sheets of copy paper fed from an input tray stack 36. Where one or more test sheets 30 are being printed instead of normal document images (at times, and with color tests, selected by the controller 100), each such test sheet 30 may be fed from the same or another sheet supply stack 36 and its test images transferred in the normal manner. The test sheet 30 is then outputted through the fuser to the same normal output path 40, as if it were any other normal sheet being normally color printed. The test sheets 30 may be dual mode sheets also serving as banner sheets for print job separations, with typical printed banner sheet information, such as one or more of the user's name, the document title, the date and time, or the like.

The spectrophotometer 12 here is mounted at one side of that output path 40 (or, it could even be mounted over the output tray 44) to sense the actual, fused, final colors being printed. The spectrophotometer output signals provide the input for the on-line color sensing and correction system 10, here with a microprocessor controller 100 and/or interactive circuitry and/or software. The controller 100, and sheet sensors along the machine 20 paper path, conventionally controls the feeding and tracking of sheet positions within the printer paper path. The controller 100 and/or a conventional sensor for fiduciary marks 33 or the like on the test sheet 30 can provide control or actuation signals to the spectrophotometer 12 circuitry for the spectrophotometer 12 to sequentially test or read the colors of each of the test patches 31 on the test sheet 30 as that test sheet 30 moves past the spectrophotometer 12 in the output path 40. The test patches 31 can be variously located and configured, as blocks, strips, or otherwise, of various digitally selected solid color images.

Thus, in the disclosed embodiment, plural test sheets 30 of paper or other image substrate material being printed by the color printer 20 can be automatically printed with pre-programmed plural test patches 31 of one or more defined colors, preferably with associated simple fiduciary marks for signaling the reading location of each colored test patch on the test sheet. Each test sheet 30 moves normally past the fixed position spectrophotometer 12, which is unobstructedly mounted at one side of the normal post-fuser machine output path 40 to both illuminate and view sheets passing thereby. This is in contrast to those prior systems requiring removing and holding a test sheet still, and moving a standard contact colorimeter or spectrophotometer over the test sheet.

It will be seen in FIGS. 1 and 2 that the exemplary compact spectrophotometer 12 shown in that example has only four different color sampling illumination sources, provided by four commonly target-aimed but sequentially operated LEDs, D1 through D4, each with different color spectrum range outputs. Each LED output may have the same simple condenser lens, such as 13 in FIG. 2, for directing the light from the respective LED onto the same test target area, as shown by the illuminated area 35 of FIG. 4. Color filters for the LEDs may be provided in some cases if desired to further control the spectral range, but are not essential. The normal target area in the system 10 embodiment herein is an area of a printed color test patch or patches 31 on a sheet of paper 30 being otherwise normally printed and outputted. An alternate or calibration target area could be an unprinted area of the test paper sheet, or a white, grey, black or other color standardized test tile or surface such as 47 automatically solenoid (or manually) inserted into the effective field of view of the spectrophotometer 12 when not blocked by a sheet 30.

As particularly shown in FIG. 2, the test target illumination by any one of the LEDs provides a variable level of light reflected from that target depending on the colors of the test patch and the selected illumination source. A portion of that reflected light may collected by a lens system such as 18 or 19 and focused by that lens system onto single photosensor chip 14 to expose an array of multiple photo-sites having 3 or 4 different colors of filtering, as shown in FIG. 5 and described herein. FIG. 2 illustrates, with dashed line light rays, both said LED illumination and the focusing by the lens system (a simple two-element optic in this 18 or 19 example) onto the chip 14 surface.

Although conventional glass or plastic lenses are illustrated, it will be appreciated that fiber optics or selfoc lenses could be utilized instead in other applications. Fiber optics may be used to conduct the illumination from the LEDs. Also, a collecting fiber optic may be used if it is desired, for example, to space the detecting photosensor array remotely.

As utilized in this disclosed embodiment of an on-line color sensing system 10, this low cost spectrophotometer 12, as mounted in the printer 20 copy sheet output path 40, can thus be part of a color correction system to automatically control and drive to color printing accuracy the printer 20 CMYK color generation with a small number of printed test sheets 30. The color correction system can sequentially look at a relatively small series of color test patterns printed on copy sheets as they are outputted. One or more mathematical techniques for color error correction with multiple spectrophotometer-detected output color signals for each color patch as input signals can provide for a greatly reduced number of required printed test patches, as shown in the above-cited references. That is, by recording the detector array multiple outputs when a test patch is successively illuminated by each individual LED, the reflectance of the test patch as a function of different wavelengths can be determined, and that reflectance of the test patch, as a function of different wavelengths, can be extrapolated or interpolated over the entire visible spectra.

An accurate color control system, as disclosed herein, can thus regularly or almost constantly provide for testing and storing current machine color printing responses to color printing input signals (an up-to-date model) for remapping LAB (or XYZ) "device independent" color inputs (for later conversion to device dependent RGB or CMYK color space for printing). That information can also be profiled into a system or network server for each different machine (and/or displayed on a CRT controller for color manipulation).

As further described in the above cross-referenced applications, the exemplary spectrophotometer 12 shown in FIGS. 1 and 2 may be, and is here, desirably optically designed to be insensitive to the separation between the sensing head and the test patch target sheets, by selecting the magnification of the target optic 18, 19, etc., to be approximately 1:1. (An exemplary focal length of those lens systems may be about 32 mm, for example, but is not so limited.) The degree of spatial insensitivity this provides allows non-contact measurements of moving printed sheets having variable distance spacings from the spectrophotometer 12, and thus allows for an unobstructed printer paper path. This is further explained in more detail in the above cross-referenced application. However, there may be some applications of this spectrophotometer in which displacement invariance is not critical, on which case lenses may not be required.

To provide a desired "overfill," such as to avoid any effect of an enlarged exposure area on the imaging chip 14 from an increased target spacing, the connecting circuitry may be set to ignore or threshold any only partially exposed cells (photo-sites) and/or may be set to only look at a fixed minimum number of centrally exposed cells, ignoring any signals from outer cells even if those outer cells are being illuminated by light reflected from the target.

With the differently color filtered cells of the FIG. 5 chip 14, the connecting circuitry can also tell which cells are being exposed to which color from an illuminated test patch. Thus, as shown in FIG. 4, plural color test patches can be simultaneously illuminated, yet can be desirably read and utilized for increased data. That is, more than one individual color test patch can be tested at a time by this spectrophotometer 12. However, that is not required here. Exposing (sensing) only one single color test patch at a time, as shown in the above cross-referenced applications, and several cited references, may be utilized. The multiple signals provided from multiple photo-sites with plural different color filters may be utilized for analyzing the reflected light from either type of test target.

As shown and described in the above-cross-referenced applications, as a components-reversal alternative to the spectrophotometer embodiment 12 of FIGS. 1 and 2, the test patch 31 illuminations may be at 45 degrees to the surface of the media on which the color test patch is printed, and the sensing system may be detecting flux diffusely scattered from the (so-illuminated) test patch at 90 degrees (perpendicular to) that same color test patch surface. In that alternative configuration a single central axis mounted chip 14 may be used.

Various technologies, architectures, and/or components may be used. For example, all of the LEDs D1, D2, D3, D4 may be provided by a single on-board chip or board. An appropriate selection of LED die with different wavelengths covering the visible spectrum may be formed in a circular pattern on a PWB.

As shown, the flux from each LED may be collimated and centrally directed to be applied to the same test patch area under the center of the spectrophotometer 12 by lens 13. The lens 13 may have an IR filter 13A. That illumination position is also on the center axis of the lens 13, which lens 13 is desirably located in the center of the ring or circle of photodetectors 14 and their associated lens systems, as shown in FIGS. 1 and 2.

FIG. 3 is a schematic or block diagram of an exemplary LED driver for the spectrophotometer 12 of FIGS. 1 and 2, portions of which may be part of the controller 100, even though it can be, in whole or in part, a separate circuit, desirably having a single driver chip or die for all of the LEDs in the spectrophotometer itself. In response to regular timing signals from the circuit 110 labeled "LED Drive" here, each LED is pulsed in turn by briefly turning on its respective transistor driver Q1 through Q4, by which the respective different spectra LEDs D1 through D4 are turned on by current from the indicated common voltage supply through respective resistors R1 through R4. Four different exemplary light output colors of the four respective LEDs are indicated in FIG. 3 by the legends next to each of those LEDs. Thus, each LED may be sequenced one at a time to sequentially transmit light.

While the LEDs in this example may thus be turned on one at time in sequence, it will be appreciated that the system is not limited thereto. There may be measurement modes in which it is desirable to turn on more than one LED or other illumination source at once on the same target area. Or, to leave on a white LED.

The relative reflectance of each actuated LEDs color or wavelength may measured by using conventional circuitry and/or software for amplifying and integrating the respective outputs of the photodiode detector chip 14 array of photosites, which also has integral sample and hold circuitry. As discussed, the LED pulsing and detector sampling rate is sufficiently non-critical and rapid for sampling each of multiple reasonable size color test patches on a normal size copy sheet moving by the spectrophotometer even for a high speed printer moving sheets rapidly through its paper path. However, by briefly pulsing the common LED driver voltage source to provide brief LED drive currents at a level above what is sustainable in a continuous current mode, even higher flux detection signals can obtained and the test patch can thus be interrogated in a shorter time period. In any case, by thresholding and/or integrating the output signals, enhanced signal-to-noise ratios can be achieved. It may be seen that FIG. 3 shows merely one example of a relatively simple and straightforward circuit. It, or various alternatives, can be readily implemented in an on-board hybrid chip or other architecture.

An additional conventional LED light emitter and detector may be integrated or separately mounted to detect black fiduciary or timing marks 33 printed on the test sheet 30 of FIG. 4, thereby providing an enable signal for illumination and reading within the respective color test patch areas. Those fiduciary marks 33 indicate the presence of an adjacent test patch 31 in the field of view of the spectrophotometer 12. However, it will be appreciated that with sufficiently accurate sheet timing and positional information already conventionally provided in the printer 20 controller 100, or provided by spectrophotometer output data, such fiducial marks 33 may not be needed. These fiduciary marks 33 may be along side of their corresponding color test patch or patch area as shown in FIG. 4, or in between each (spaced apart) color test area. I.e., the fiducial marks may be parallel to, or in line with, the test patches in the direction of motion of the test sheet relative to the spectrophotometer.

Individual calibration for each of the spectrophotometer's LED spectral energy outputs may be done by using a standard white (or other) tile test target of known reflectivity for the spectrophotometer to convert each LED measurement to absolute reflectance values. This calibration can be done frequently, automatically, and without removing the spectrophotometer from the printer with a standard white calibration tile test surface, such as 47 shown in FIG. 6, being manually, or preferably automatically (as by a solinoid), placed oppositely from the spectrophotometer 12, on the other side of the paper path 40 but in the field of view of the photosensor array and its lens system 13. Thus, during any selected, or all, of the inter-sheet gaps (the normal spacing between printed sheets in the sheet path of the printer) a recalibration can be carried out without having to move or refocus the spectrophotometer.

This or other calibration systems can convert the individual output energies of the respective LEDs at that point in time on the calibration tile 47 into respective individual reflectance measurement values from the photosensor array (s). That calibration data can then be electronically compared to previously stored standard characteristics data in the controller 100, or elsewhere, to provide calibration data for the spectrophotometer 12, which may be used for calibration of its other, color test patch generated, data. The calibration data can also be used to adjust the individual LED output energies to compensate for LED aging or other output changes, by adjusting the applied current or voltage (if that is individually programmable) or by increasing the respective turn-on times of the LEDs.

Initial spectrophotometer calibration data may be stored in an integral PROM IC shipped with the spectrophotometer, if desired. Alternatively, LED output initial calibration data may be programmed into the software being used to analyze the output of the spectrophotometer in other known manners, such as loading it into the disc storage or other programmable memory of the printer controller 100 or system print server.

It is well known to use conventional optical filters of different colors for each of respectively different color LED spectrophotometer target illumination sources. In particular, it is well known to use such color filters to exclude secondary emissions from LEDs, and/or to further narrow the output spectra of LED illumination sources. Such color filters are believed to be used for that purpose in some Accuracy Microsensors™ LED based commercial products, for example. However, it will be further appreciated by those skilled in this art that such color filters are not needed for those LEDs having sufficiently narrow bandwidths or for those LEDs which do not have secondary emissions that need to be suppressed. Therefore, filters may, but need not, be employed for the LEDs of the subject spectrophotometer.

It will also be noted that spectrophotometers have been made using illumination sources other than LEDs. For example, multiple electroluminescent (EL) emitters with filter and active layers as in HP U.S. Pat. No. 5,671,059, issued Sep. 23, 1997, or incandescent lamps. Also, as noted in the introduction, white (instead of narrow spectrum) LED illuminators and plural sensors with different color filters are disclosed in EP 0 921 381 A2 published 09.06.1999 for a color sensor for inspecting color print on newspaper or other printed products.

In the particular spectrophotometer embodiment 12 configuration shown in FIG. 2, all of the plural different color emission LEDs are together in one central unit, board, or chip, projecting light in parallel along the central or zero axis of the spectrophotometer 12 at 90 degrees to the test target (e.g., the color patch on the moving sheet of paper), so as to provide a substantially circular, rather than elliptical, illuminated area 35 of the test target 31.

As also shown in FIG. 2, it is preferable in that embodiment to mount one or more photo-sensor chips 14 in the spectrophotometer with the planar light receiving surface thereof physically oriented at 90 degrees to (perpendicular to) the test target area plane while receiving the reflected light from the test target optically oriented at 45 degrees to the test target.

The illustrated exemplary spectrophotometer 12 measures the colors of a multiple colors test target illuminated surface area 35 with plural opposingly spaced multi-photo-site photodetector chips 14, each with an associated imaging lens system such as 18 or 19. Each such lens system 18 or 19 preferably has approximately 1:1 optics for displacement insensitivity, and an optical axis at 45 degrees to the illuminated color test target area surface, through which lens system its respective multi-photo-site photodetector chip 14 receives an image of at least a portion of the illumination from the illuminated color test target area surface. Each multi-photo-site photodetector chip 14, as noted, is preferably a low cost commercial photodetector chip which is normally a component part of a document color imaging bar having at least three rows of small closely spaced photo-sites with respective different color filters to provide at least three different spectral responsive electrical output signals. A photodetector chip 14 is mounted on that optical axis of each imaging lens system 18, 19, etc., oriented substantially in the plane of the image of the reflected illumination of the illuminated test target area provided by that particular lens system.

In particular, in this embodiment 12, each optical axis of each imaging lens system 18, 19, etc., is oriented at 45 degrees to the illuminated color test target surface, and each photodetector chip is mounted perpendicular to the illuminated color test target surface area, as shown in FIG. 2, for more effective photodetection of the reflected target illumination, especially with tilting or angular displacement of the test surface relative to the spectrophotometer and its normal axis.

That is, each multiple-photo-cites detector chip 14 here in this particular embodiment has a perpendicular (vertical in this FIG. 2 view) orientation relative to the color test surface, in order to put each chip 14 in the image plane of its 45 degree optics path and thereby minimize image distortion. In the illustrated architecture each chip 14 is mounted on and perpendicular to a common planar spectrophotometer 12 mounting base, to which the LED's may also be mounted, as shown.

As noted, this spectrophotometer 12 configuration also desirably provides improved insensitivity to spatial, angular and azimuthal variations in the illuminated color test target surface relative to the spectrophotometer.

As explained in the cross-referenced application D/A1024, the change from a 45–0 degree system to a 0–45 degree system has been discovered to reduce measurement errors from test target angular or azimuthal misalignment relative to the spectrophotometer 12.

By way of further explanation, in a typical printer paper path with spaced baffles the angle of the test paper sheet surface relative to the central axis of the spectrophotometer can vary somewhat, for various reasons. By having all the LEDs centrally located, their illumination pattern on the test target may be formed from rays that hit the target at approximately 90 degrees, i.e., normal to the target. This will produce a circular or nearly circular irradiance pattern on a selected area of the target when the target surface is at 90 degrees thereto, as intended. When the target surface deviates from 90 degrees, by factors such as paper lead or trail edge curl, paper buckle, sensor mounting misalignment, or other effects, this LED irradiance pattern becomes only slightly elliptical, with an area larger than the circle by the factor $1/\cos(\theta)$, where theta is the deviation from 90 degrees. For example if the incident angle were to become 93 degrees, then theta would be 3 degrees, the area of the irradiance would be $A/\cos(3)=1.001A$, where A was the selected illuminated area. The flux reflected from the target and collected by the detectors is proportional to the irradiance. Since it may be seen that the irradiance (energy per unit area) varies very little for this 3 degrees example, only by 0.001, the signals from the detectors likewise vary very little.

An additional, if less significant, feature in improving spectrophotometer accuracy for variable target angles with this embodiment 12 is to provide, in addition to the above, the averaging of the outputs of the plural photodetectors which are viewing the irradiance area from different positions around it, such as with an arrangement of plural photosensors as in FIG. 1, so as to average the varying angular and/or azimuthal reflectivity of the target area, and thus further increase the insensitivity to angular misalignment with the target area. In the above example of a 3 degree tilted target surface, the detector on one side of the spectrophotometer central axis will view the illuminated target area at 45 minus 3 degrees, while the detector on the opposite side of the spectrophotometer will view the same illuminated area at 45 plus 3 degrees, but their output signals may be averaged. These plural spaced detectors may desirably be low cost single chip, but multi-pixel, and plural color filter, photo-detectors such as 14, or the like, as those described in detail in this application.

While the embodiment disclosed herein is preferred, it will be appreciated from this teaching that various alternatives, modifications, variations or improvements therein may be made by those skilled in the art, which are intended to be encompassed by the following claims.

What is claimed is:

1. A color correction system for a color printer having an output path for moving printed color sheets, including printed test sheets with printed color test patches, in which a spectrophotometer is mounted adjacent to said printer output path for sensing the colors printed on said printed color test patches on said printed test sheets as said printed test sheets are moving past said spectrophotometer in said output path, and in which at least one illumination source is provided for illuminating said color test patches with different illumination spectra;

wherein plural sets of plural small test patches of different colors are printed on said printed test sheets, and wherein a plural number of said plural small test patches of different colors in a said set are simultaneously illuminated by said illumination source, and wherein said spectrophotometer has a photodetector system for providing different electrical signals in response to reflected illumination from said different colors of said plural small test patches of different colors being simultaneously illuminated by said illumination source, wherein said photodetector system comprises at least one photodetector having an photodetecting area with multiple photo-sites including at least three different sets of said photo-sites having different spectral responses.

2. The color correction system of claim 1, wherein said photodetector system comprises at least one photodetector chip having at least three rows of small closely spaced multiple photo-sites with integral red, green and blue color filtering respectively, to provide at least three different spectral responses with at least three different electrical output signals.

3. The color correction system of claim 1, further including an optics system for simultaneously imaging on different said portions and different said photo-sites of said photodetecting area of said photodetector a plural number of said plural small test patches of different colors in a said set of said plural small test patches of different colors being simultaneously illuminated by said illumination source.

4. The color correction system of claim 1, wherein said at least one illumination source comprises plural LEDs providing a plural number of different spectra illuminations, and a sequential actuation circuit for said LEDs.

5. The color correction system of claim 1, wherein said photodetector system comprises at least one photodetector chip having at least three rows of small closely spaced multiple photo-sites with different color filtering to provide at least three different spectral responses with at least three different electrical output signals, and wherein each of a plural number of said plural small test patches of different colors in a said set of said plural small test patches of different colors being simultaneously illuminated by said illumination source simultaneously exposes different said multiple said photo-sites in each of said three rows of multiple photo-sites with different color filtering to provide at least three different spectral responses with at least three different electrical output signals for each of said small test patches of different colors at substantially the same time.

6. A spectrophotometer comprising at least one illumination source for illuminating a color test target area having plural different color areas simultaneously to provide simultaneously reflected light from said plural different color areas, and comprising at least one photodetector chip having a photosensitive area with multiple small and closely spaced photo-sites, said photodetector chip being mounted to receive, in discrete areas of said photosensitive area, at least a portion of said simultaneously reflected light from said simultaneously illuminated plural different color areas of said color test target area, and wherein said multiplicity of small and closely spaced photo-sites have at least three different spectral responses, and wherein said simultaneously reflected light from said simultaneously illuminated plural different color areas received on said discrete areas of said photosensitive area of said photodetector chip provides said at least three different spectral responses for each of said simultaneously illuminated plural different color areas substantially simultaneously.

7. The spectrophotometer of claim 6, wherein said multiplicity of small and closely spaced photo-sites with said at least three different spectral responses are provided by at least three rows of said photo-sites having different color filtering, and portions of all three said rows are simultaneously exposed to said reflected light from said illuminated color test target to provide said at least three different spectral responses and at least three different corresponding electrical signals substantially simultaneously for each of said plural different color areas.

8. The spectrophotometer of claim 6, wherein said at least one illumination source comprises a limited plural number of said illumination sources comprising less than approximately five plural LEDs with different spectral emissions, and a sequential actuation circuit for sequentially actuation of said plural LEDs, for broad spectrum color measurements.

9. The spectrophotometer of claim 6, wherein said at least one illumination source comprises a white light illumination source.

10. The spectrophotometer of claim 6, wherein said spectrophotometer is a part of a color control system of a color printer with a printed sheets output path and a system for printing and moving though said same printed sheets output path color test sheets printed with multiple sets of said plural different color areas, and wherein said spectrophotometer is mounted adjacent to at least one side of said printed sheets output path of said color printer to sequentially analyze said multiple sets of said plural different color areas of said printed color test sheets printed by said printer as said printed color test sheets are moving past said spectrophotometer in said printed sheets output path of said color printer.

11. The spectrophotometer of claim 6, wherein said at least one photodetector chip comprises a plurality of said photodetector chips mounted arrayed around said color test target area and spaced from said color test target area to receive said reflected light from said plural different color areas of said color test target area at substantially the same angle from opposing directions.

12. The spectrophotometer of claim 6, further including optics for simultaneously focusing said reflected light from said plural different color areas of said color test target area onto respective said discrete areas of said photosensitive surface area.

13. The spectrophotometer of claim 6, wherein said photodetector chip is a component part for a document color imaging bar.

14. The spectrophotorneter of claim 6, wherein said at least one photodetector chip is a component part for a document Color imaging bar having at least three rows of small closely spaced photo-sites with integral red, green and blue color filters, respectively, to provide different electrical output signals from said multiple photo-sites in said three rows for the same said reflected light.

15. A method of plural color measurements of the plural colors of a color test target area having plural different color test areas, comprising simultaneously illuminating at least a portion of said plural different color test areas of said color test target area with at least one illumination source to produce reflected light therefrom, and substantially simultaneously measuring said reflected light from said plural different color test areas by exposing said reflected light from said plural different color test areas simultaneously onto plural different sets of multiple photo-sites of at least one multi-photo-site photodetector, which plural different sets of simultaneously exposed multiple photo-sites comprise at least three different types of photo-sites with at least three different spectral responses providing at least three different types of multiple output signals from each of said different sets of multiple photo-sites exposed by said reflected light from said plural different color test areas.

16. The method of plural color measurements of the plural colors of a color test target area having plural different color test areas of claim 15, wherein said simultaneously illuminating of at least a portion of said plural different color test areas of said color test target area with at least one illumination source includes the sequential actuation of respective plural different LEDs providing plural different spectral illuminations of said color test target area for providing broad spectral analysis of said plural different color test areas.

17. The method of plural color measurements of the plural colors of a color test target area having plural different color test areas of claim 15, wherein said at least one illumination source is a white light source.

18. The method of plural color measurements of the plural colors of a color test target area having plural different color test areas of claim 15, wherein said at least one multi-photo-site photodetector is a photodetector chip which is normally a component part of a document color imaging bar having at least three rows of small closely spaced multiple photo-sites with integral red, green and blue color filters respectively.

19. The method of plural color measurements of the plural colors of a color test target area having plural different Color test areas of claim 15, wherein said reflected light is focused by substantially displacement insensitive optics onto said at least one multi-photo-site photodetector.

20. The method of plural color measurements of the plural colors of a color test target area having plural different color test areas of claim 15, wherein a plurality of said multi-photo-site photodetectors are angularly spaced around said color test target area.

21. An improved method of color control of a color printer, comprising:

printing test sheets with multiple sets of multiple small adjacent but different color test patches in said printer, illuminating at least a portion of a said test sheet so as to simultaneously illuminate a plurality at said multiple small adjacent but different color test patches on a said test sheet, and simultaneously imaging the reflected said illumination of said simultaneously illuminated plurality of different color test patches onto plural different areas of at least one photodetector having plural differently color responsive sets of multiple photo-sites, to substantially simultaneously provide plural discrete color signals from said plural differently color responsive sets of multiple photo-sites from said imaging of said reflected illumination from said plural different color test patches onto said different areas, and controlling the color printing of said color printer with said plural discrete color signals.

22. The improved method of color control of a color printer of claim 21, wherein said simultanious illumination of said plural color test patches to simultaneously illuminate at least a plurality of said multiple small adjacent but different color test patches comprises the sequential illumination of plural different spectral emission LEDs.

23. The improved method of color control of a color printer of claim 21, wherein said at least one photodetector is a chip which is normally a component part of a document color imaging bar, having at least three rows of small closely spaced photo-sites with integral red, green and blue color filtering to provide at least three different spectral responses with at least three different electrical output signals.

24. The improved method of color control of a color printer of claim 21, wherein said illumination and said at least one photodetector are provided by an integral spectrophotometer unit mounted at one side of a moving printed sheets output path of said color printer for on-line color control of said color printer.

25. The improved method of color control of a color printer of claim 21, wherein said simultaneous imaging of said reflected illumination of a plurality of said different color test patches onto different areas of said at least one photodetector is through substantially displacement insensitive optics providing for variable spacing of said test sheet therefrom.

* * * * *